United States Patent [19]
Micali

[11] Patent Number: 5,615,269
[45] Date of Patent: Mar. 25, 1997

[54] IDEAL ELECTRONIC NEGOTIATIONS

[76] Inventor: Silvio Micali, 459 Chestnut Hill Rd., Brookline, Mass. 02146

[21] Appl. No.: 604,870

[22] Filed: Feb. 22, 1996

[51] Int. Cl.$^6$ .............................. H04L 9/00; H04K 1/00; G06F 17/60
[52] U.S. Cl. .................... 380/49; 364/227.3; 364/918.9; 380/24; 395/207
[58] Field of Search ................................ 380/23, 49, 24; 364/402, 227.3, 918.9

[56] References Cited

U.S. PATENT DOCUMENTS

| | | | |
|---|---|---|---|
| 5,224,162 | 6/1993 | Okamoto et al. | 380/24 |
| 5,276,737 | 1/1994 | Silvio . | |
| 5,315,658 | 5/1994 | Silvio . | |
| 5,373,558 | 12/1994 | Chaum | 380/23 |
| 5,511,121 | 4/1996 | Yacobi | 380/24 |
| 5,521,980 | 5/1996 | Brands | 380/30 |

OTHER PUBLICATIONS

B. Schneier; Applied Cryptography, Second Edition; 22 May 1995; John Wiley & Sons, Inc.

Goldwasser, Shafi, Silvio Micali and Charles Rackoff, "The Knowledge Complexity of Interactive Proof Systems" Siam J. Comput. vol. 18, No. 1, pp. 186–208, Feb. 1989, Society for Industrial and Applied Mathematics.

Goldreich, Oded, Silvio Micali and Avi Wigderson, "Proofs that Yield Nothing But Their Validity or All Languages in NP Have Zero–Knowledge Proof Systems Journal of the Association for Computing Machinery", vol. 39, No. 1, Jul. 1991, pp. 691–729.

Goldreich, Oded, Silvio Micali and Avi Wigderson, "How to Play Any Mental Game or A Completeness Theorem for Protocols with Honest Majority" (Extended Abstract) 1987, pp. 218–229.

Yao, Andrew C., "Protocols for Secure Computations" (Extended Abstract) 1982, University of California, Berkeley, Ca., pp. 160–169.

Micali, Silvio and Philip Rogaway, "Secure Computation" (Abstract) Undated.

Ben–Or, Michael, Shafi Goldwasser and Avi Wigderson, "Completeness Theorems for Non–Cryptographic Fault–Tolerant Distributed Computation" (Extended Abstract) ACM, 1988, pp. 1–10.

Chaum, David, Claude Crepeau and Ivan Damgdrd, "Multiparty Unconditionally Secure Protocols" (Extended Abstract) ACM, 1988, pp. 11–19.

Dolev, Danny, Cynthia Dwork and Moni Naor, "Non–Malleable Cryptography" (Extended Abstract) ACM, 1991, pp. 542–552.

*Primary Examiner*—Stephen C. Buczinski
*Attorney, Agent, or Firm*—David H. Judson

[57] ABSTRACT

There is described an electronic communications method between a first party and a second party, with assistance from at least a plurality of trustees, enabling an electronic transaction in which the first party having a selling reservation price (SRP) and the second party having a buying reservation price (BRP) may be committed to a transaction if a predetermined relationship between SRP and BRP is established, but not otherwise. The method begins by having each of the parties transmit shares of their respective reserve prices to the trustees. These shares are such that less than a given number of them does not provide enough useful information for reconstructing the reserve prices while a sufficiently high number of them allows such reconstruction. The trustees then take some action to determine whether the predetermined relationship exists without reconstructing SRP and BRP. If the predetermined relationship exists, then the trustees provide information that allows a determination of the sale price according to a given formula. Otherwise, the trustees determine that no deal is possible. As used herein, "sale" is merely respresentative as the transaction may be of any type including, without limitation, a sale, lease, license, financing transaction, or other known or hereinafter created financial commercial or legal instrument.

48 Claims, 3 Drawing Sheets

IDEAL ELECTRONIC NEGOTIATIONS

CROSS-REFERENCE TO RELATED APPLICATION

The present application is related to and claims priority on prior copending Provisional Application No. 60/009,577, filed Jan. 3, 1996 and titled "Blind Negotiations."

TECHNICAL FIELD

The present invention relates generally to secure electronic communications systems and more particularly to cryptographic methods that enable participants in a negotiation to agree on a common price for a given transaction without requiring either participant to reveal certain information about its bargaining position unless a suitable agreement can in fact be reached.

BACKGROUND OF THE INVENTION

In the past two decades, many secure transactions have been devised that compute quantities from certain hidden data without revealing all such data. For instance, Yao (in the Proceedings of Foundations of Computer Science Conference, 1982) presented a solution to the so-called Two-Millionaire problem that involved this approach. In this problem, two millionaires wish to know who is richer without revealing their respective monetary worth. In Yao's solution, the parties engage in cryptographic exchange, each encoding in a special manner the amount of money he/she owns. At the end of the exchange, one of the millionaires is in possession of information indicating which of the two is the richer one and can then, without proof, announce the result to the other.

In another example, Goldreich, Micali, and Widgerson presented the first of a series of cryptographic protocols for secure multi-party computation. This protocol enabled n parties (whose majority is honest), where party I has a secret input $x_i$, to evaluate $f$ on their private inputs, without revealing these inputs more than absolutely necessary. At the simplest level, the parties compute $y=f(x_1, \ldots, x_n)$ without revealing more about the $x_i$'s that is implicitly revealed by the value y itself. More sophisticated and precise definitions of this protocol were later described, for instance in the work Micali and Rogaway.

In the past, traditional physical proximity has encouraged sellers and buyers to negotiate in good faith. Physical proximity creates enough circumstantial evidence of an enforceable agreement, and also requires a considerable investment of time and effort on both sides, thus reducing the buyer's temptation of negotiating just for "curiosity" without any serious intentions of buying. Such goals, however, are more difficult to achieve where business transactions are carried out more and more at a distance (e.g., over an electronic network). Consider the example of purchasing a house over the Internet. Photographic information of a piece of property is readily available over the Internet, and digital signatures may help in signing a contract. However, in this new setting, it is possible for a seller to negotiate with many potential buyers simultaneously and at a distance so that the various buyers may not be aware of each other. The seller can then use one buyer's offer for obtaining better offers from others, even with stringent time constraints. At the same time, the new setting makes it very convenient for uncommitted buyers just to shop around for a seller's "true" price, and then possibly sell this information to others.

There remains a need in the art to provide cryptographic protocols that enable parties to negotiate and consummate business and other transactions electronically.

BRIEF SUMMARY OF THE INVENTION

It is the primary object of the present invention to describe an entirely new class of electronic cryptographic-based transactions, referred to herein as "blind negotiations."

A "blind negotiation" (sometimes referred to as "ideal negotiation") according to the present invention is a new electronic transaction wherein a seller S and a buyer B wish to see whether they can agree on a price for a given good or service. It is assumed that the seller has a "reservation" prices, SRP, at which she is willing to sell now (not necessarily the minimum of such prices). Similarly, the buyer has a reservation price, BRP, at which he is ready to buy now (not necessarily the maximum of such price). In a blind negotiation, the current reservation price of each party is a secret of that party.

A blind negotiation is a cryptographic system that guarantees the following two properties (which are NOT readily obtainable even in a physical or face-to-face transaction):

1. Enforceable Agreement. Both parties reach an agreement on a price P (between SRP and BRP) whenever SRP<(or equal to) BRP, or else;
2. Proved Privacy. Each party is provided a proof that SRP>BRP that does not reveal the other's reservation price.

In a blind negotiation, if seller and buyer learn that no deal is possible (i.e., that SRP>BRP), then they may decide to try another round of negotiating, presumably after changing their reservation prices, or they may decide to quit negotiating. In the latter case, the seller knows that no one has learned her reservation price, and thus that she can participate in future negotiations with her "bargaining power" intact. If, instead, a deal is possible, a blind negotiation may reveal the two reservation prices. Indeed, for instance, assume that the two parties agree to "split in the middle" when a deal is possible (i.e., they adopt P=SRP+BRP/2 as the actual sale price). Then, after reaching agreement on a-price P by means of a blind negotiation, each party can, knowing his own reservation price and the average of the two, easily compute the other's reservation price. Indeed, when a blind negotiation system realizes that SRP<(or equal to) BRP, then the system can just reveal SRP and BRP, so that P=SRP+BRP/2 can be easily computed.

It should be noted that in real-life, blind negotiations are not easily obtainable. In fact, if one of the parties (e.g., the seller) makes an offer to sell at a given price, then that offer already provides valuable information about SRP. A similar problem exists when the first offer is made by the buyer. As a result, in a real-life negotiation, sellers and buyers are unwilling to make first offers. This, however, is not a problem in a blind negotiation system.

It is thus an object of the present invention to provide cryptographic techniques and systems for implementing such blind-negotiation schemes.

It is a further more specific object of the invention to facilitate blind negotiations using one or more trusted parties who either preferably do not learn BRP or SRP or, if they do, they cannot misuse such information. Such trusted parties may be actively involved in the negotiation or, alternatively, be required only when initial exchanges of communications between buyer and seller leaves one of the parties with uncertainty about the results of the negotiations.

The constraint that a deal is achievable if SRP<(or equal to) BRP is preferable, although other functional relationships between SRP and BRP may be implemented in the blind negotiation system. Thus any reference to the preferred constraint of SRP<(or equal to) BRP should not be taken to limit the present invention. Similarly, the constraint that the actual sale price is in-between SRP and BRP is merely preferable, but not required either.

Thus, in one embodiment, there is described an electronic communications method between a first party and a second party, with assistance from at least a plurality of trustees, enabling an electronic transaction in which the first party having a selling reservation price (SRP) and the second party having a buying reservation price (BRP) may be committed to a transaction if a predetermined relationship between SRP and BRP is established, but not otherwise. The method begins by having each of the parties transmit shares of their respective reserve prices to the trustees. These shares are such that less than a given number of them does not provide enough useful information for reconstructing the reserve prices while a sufficiently high number of them allows such reconstruction. The trustees then take some action to determine whether the predetermined relationship exists without reconstructing SRP and BRP. If the predetermined relationship exists, then the trustees provide information that allows a determination of the sale price according to a given formula. Otherwise, the trustees determine that no deal is possible. As used herein, "sale" is merely respresentative as the transaction may be of any type including, without limitation, a sale, lease, license, financing transaction, or other known or hereinafter created financial commercial or legal instrument.

In a modification to this embodiment, the actions are taken not only by the trustees alone, but also in conjunction with the first party and the second party.

In an alternate embodiment, the seller and buyer communicate with a single trustee, who can determine whether a deal is possible without learning SRP or BRP. In a still further embodiment, the trusted party may be a secure piece of hardware that receives an encrypted version of SRP and an encrypted version of BRP and determines whether a deal is possible and at what price.

Yet in another embodiment, the blind negotiation is achieved with "invisible" trustees. In such a case, the seller and buyer do not collaborate with any trustee initially and implement a blind negotiation system if they continue collaborating properly. However, if one of the parties stops collaborating, the other party can access one or more trustees who are capable of completing the interrupted blind negotiation.

Of course, in a blind negotiation according to the invention, the parties need not agree on a final price merely by splitting the difference between their respective reserve prices. Indeed, in a blind negotiation the two parties may agree on the actual sale price by any strategy they want. For instance, if a deal occurs in the first blind negotiation, then the parties may agree to split in the middle, but if a deal becomes possible in the next round of blind negotiation, then they may agree on the actual sale price by means of a formula that favors the party who has made the biggest "concession" in the second round. Alternatively, they may decide to favor the party who has varied his reservation price by a smaller degree in the second round, or by some such other approach.

BRIEF DESCRIPTION OF THE DRAWINGS

For a more complete understanding of the present invention and the advantages thereof, reference should now be made to the following Detailed Description taken in conjunction with the drawings in which.

DETAILED DESCRIPTION

Figure 1:
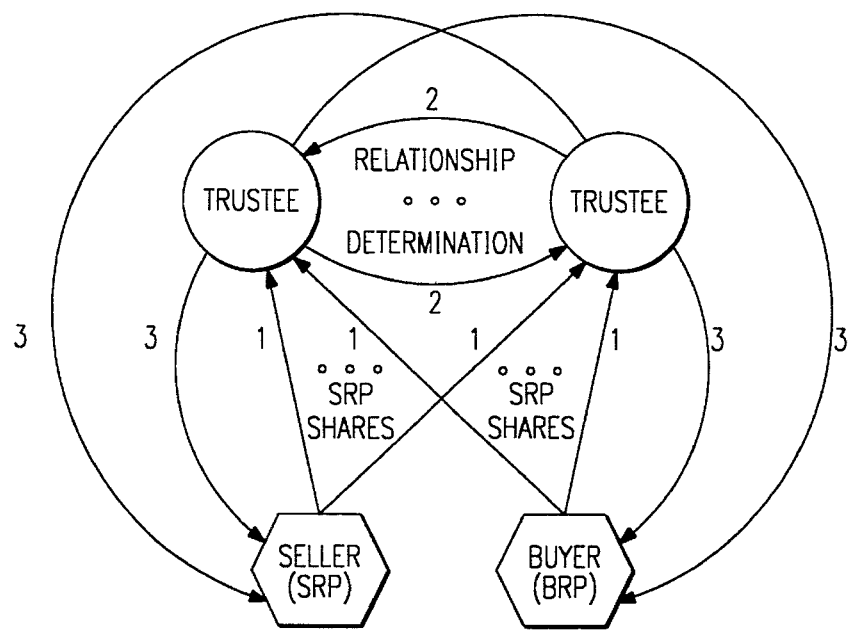
FIG. 1 illustrates a preferred embodiment of the invention wherein an electronic process having three conceptual steps (as numbered) is effected by first and second parties, with the assistance of a plurality of trustees, in order to achieve an ideal electronic negotiation.
Figure 2:
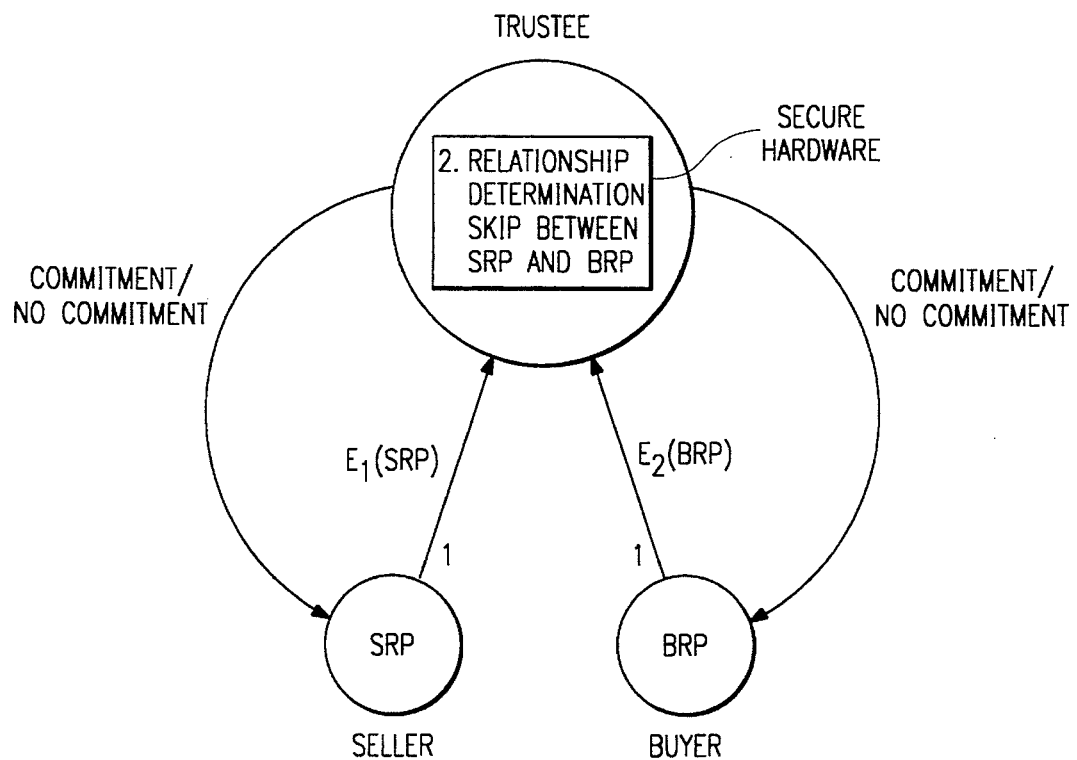
FIG. 2 illustrates a preferred embodiment of the invention wherein an electronic process having three conceptual steps is effected by first and second parties, with the assistance of a trustee comprising secure hardware, in order to achieve an ideal electronic negotiation.
Figure 3:
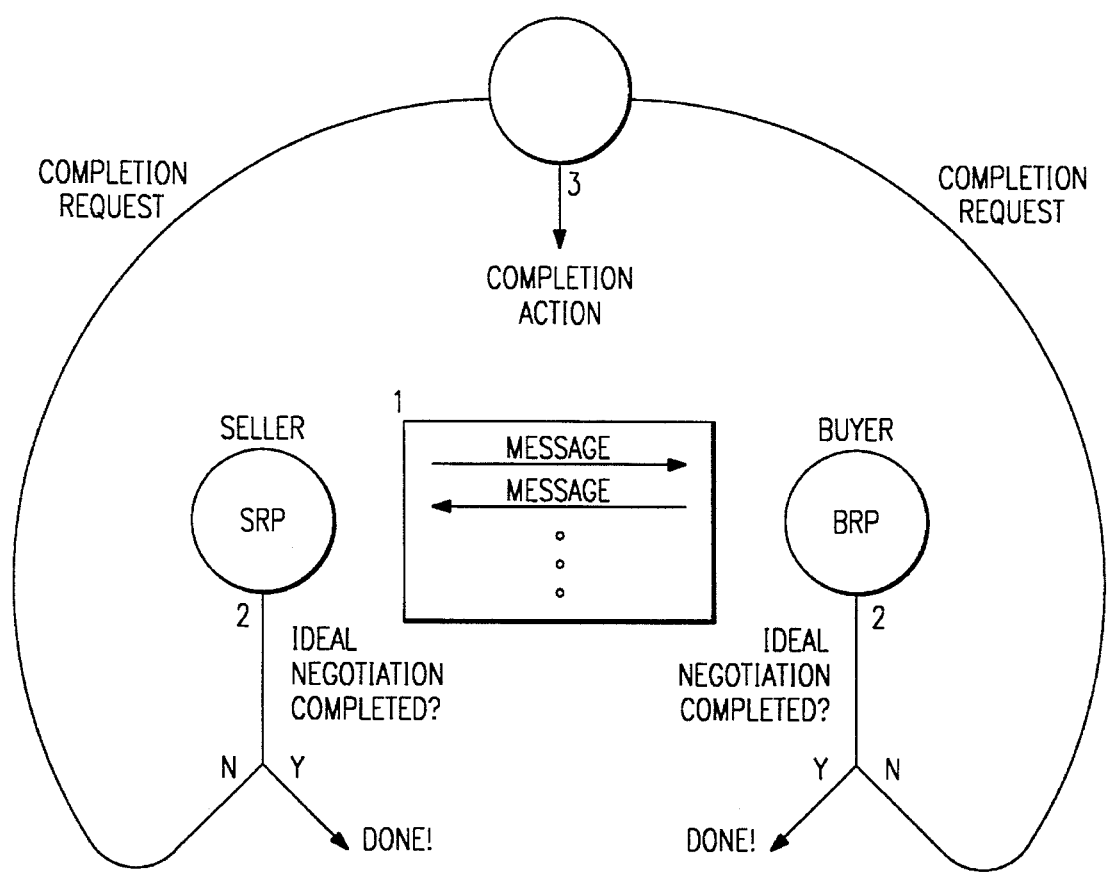
FIG. 3 illustrates an embodiment of the invention wherein an electronic process is effected by having first and second parties exchange messages to attempt to complete an ideal negotiation, and the use of the trusted party to complete the action if needed.
Figure 4:
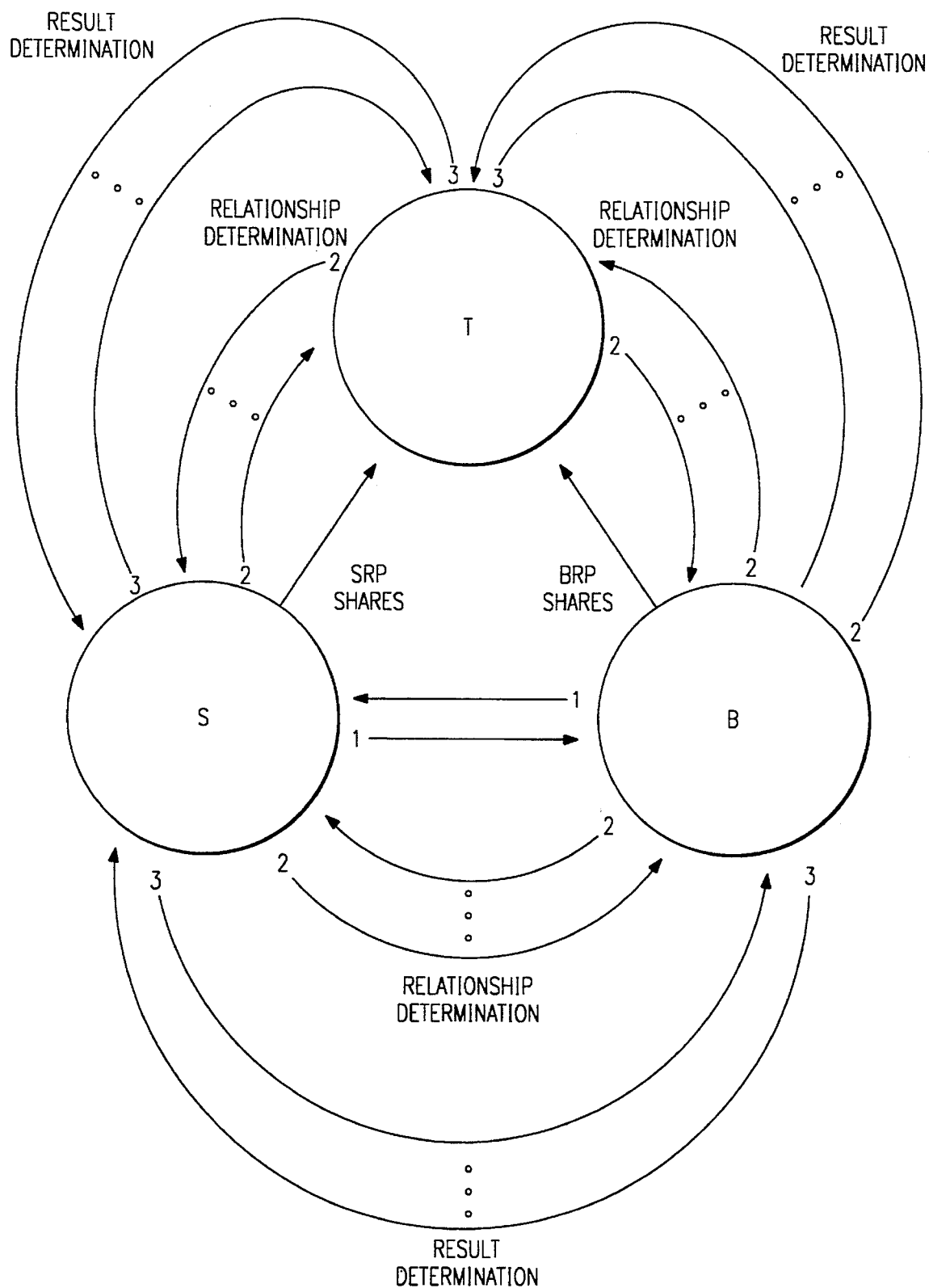
FIG. 4 illustrates a share method embodiment of the invention, involving three numbered steps, wherein seller and buyer are players who, together with at least one other trustee-player(s), take action in determining whether a given relationship exists between SRP and BRP in order to effect the ideal negotiation.

Several different types of blind negotiation systems are described below. For each one of these systems there is also presented several variations and modifications. Such variations and modifications also apply to the other blind negotiation systems and not just the particular schemes with which they are described.

Blind Negotiations With Multiple Trustees/Players

In a first embodiment, an n-party secure computation (e.g., the protocol of Goldreich, Micali and Widgerson, or that of Ben-Or, Goldwasser and Widgerson, or that of Rabin and Ben-Or, or that of Chaum, Crépeau and Damgård) or a "suitable" simplification thereof is used to facilitate a blind negotiation application.

By way of brief background, it is known in the art that secure protocols enable n players (a suitable majority of which is honest) to evaluate a given function $f$ on their private inputs, without revealing these inputs more than absolutely necessary. At the simplest level, the parties compute $y=f(x_1, \ldots, x_n)$ without revealing more about the $x_i$'s that is implicitly revealed by the value y itself. Of course, if each player keeps his own input for himself, the privacy of the inputs $x_i$ is perfectly maintained, but no joint computation of $f$ can occur. Of course too, if a player reveals his input to some other player, this may facilitate some joint computation, but it may not keep the player's input as secret as it should be. Rather, in most secure-computation protocols, a player I takes his own secret input $x_i$, and constructs a secret random polynomial P(x)—modulo a prime p, p>n, and of degree t, 1<t<n—such that $P(0)=x_i$, his own input. (In other words, the player chooses the last coefficient of the polynomial to be his own input, and all other coefficients at random. If the input of a player is a binary string of at most, say, k bits, then p can be chosen not only >n, but also having k+1 bits.)

Then, the player privately gives player a the value P(a), player b the value P(b) and so on. Thus, no single player (other than i), nor any collection of players with less than t members, may know the polynomial P(x), nor the input $x_i$. However, collectively, the players (indeed any t+1 of the players) know P(x). Indeed a t-degree polynomial may be easily obtained by interpolation from its value at t+1 different points. Thus, sufficiently many players can easily reconstruct P(x), and thus P(0)=$x_i$, while sufficiently fewer players cannot even guess $x_i$ better than at random.

Each player a thus (1) possesses a share, P(a), of any other player's input, and (2) if the majority of the players want, the input of every player can be revealed, but (3) without the cooperation of the majority of the players, each input remains unpredictable. After sharing each input among all players in such a fashion, a typical secure computation protocol then proceeds to evaluate the given function on the player's inputs, but working on their shares, rather than on the inputs directly. For instance, if the function dictates that the inputs $x_i$ of player i, encoded by a polynomial P (i.e., P(0)=$x_i$), should be added (mod p) to the input $x_j$ of player j, encoded by a polynomial Q (i.e., Q(0)=$x_j$), then each player k, whose share of $x_i$ is $i_k$=P(k) and whose share of $x_j$ is $j_k$=Q(j), adds $i_k$ and $j_k$ mod p, thereby computing (P+Q)(k), that is, a share of ($x_i$+$x_j$ mod p), the sum of the two inputs mod p.

As for another example, if the function dictates that the input $x_i$ of player i (encoded by a polynomial P) should be multiplied modulo p with the input $x_j$ of player j (encoded by polynomial Q), then each player k, whose share of $x_i$ is $i_k$=P(k) and whose share of $x_j$ is $j_k$=Q(j), multiplies $i_k$ and $j_k$ modulo p, thereby computing (PQ)(k), that is, a share of $x_i x_j$ (mod p), the product of the two inputs modulo p.[1]

[1] Note that the product polynomial PQ has degree 2t, and thus one needs 2t points for interpolating it. Therefore, there must by sufficiently many honest players. If one had to execute a chain of several multiplications—e.g., ((P +Q)QQ+Q)P— by means of the above method, then the number of honest players needed would become totally impractical. Thus, different (degree-reduction) methods have been devised in the literature. The above method, however, is quite practical if one only needs to compute a single product mod p.

Though not all operations on the inputs translate into operations on the shares in a way that is as simple as in the case of the "addition mod p" operation or of a (single) multiplication modulo p, at the end of the secure computation the players have each his own share of y-f($x_1$, . . . , $x_n$), that is, each player k has the value F(k), where F is a t-degree polynomial such that F(O)=y. Thus all players may release their shares, so as to allow the reconstruction of F by polynomial interpolation, and thus the reconstruction of y without releasing any unwanted information about the inputs $x_i$'s. This reconstruction also works in a simple way (provided that there are sufficiently many honest players) even though some players may be bad and release incorrect shares. This is just the basic background on multi-party secure computations. The reader is directed to the art references for further details.

With this background, it can now be described how one such secure computation protocol is used to facilitate a blind negotiation.

A First Share-Method

As noted above, as illustrated in FIG. 1, a secure-computation protocol assumes that there are n parties, the majority of which are honest. In a blind negotiation there are two parties, the seller and the buyer. It cannot be assumed that both parties are honest, however. Thus, in this embodiment seller and buyer cooperate with one or more trustees. These are additional parties that are assumed to be trustworthy (in particular, trusted to follow the prescribed instructions of a secure-computation protocol). By means of a system such as described below, the trustees enable seller and buyer to complete their negotiation in a blind way. It is desired, however, that the trustees should not receive much information, nor should they be able to misuse whatever information they do receive.

The following blind negotiation system further makes use of digital signatures. In a digital signature scheme, each party X has a secret signing key $S_x$ and a matching public verification key $P_x$. Party X may obtain its digital signature of a message (string) m, $SIG_x$(m), by running an algorithm SIG on inputs $S_x$ and m (thus, $SIG_x$(m)=SIG($S_x$,m)). The signature of party X on a message m is verified by running a verifying algorithm VER on the signature and X's public key.

The following now describes how to use a multi-party secure computation protocols for building a blind negotiation systems with trustees and digital signatures. For instance, a secure computation with n=3 exists by asking one trustee to join the computation. Thus, if either the seller or the buyer is honest, since a trustee is presumably selected with trustworthiness as a prerequisite, an honest majority exists. If desired, larger values of n may be chosen in a secure computation protocol, with the cooperation of more trustees. This way, even if one or more trustees turn out to be malicious, the majority of all players are honest.

Assume now that there are sufficiently many trustees, so that there is a total number of n>2 players, a suitably majority of which are honest. Without loss of generality, the seller is player 1, the buyer player 2, and the trustees players 3, . . . ,n. Then, n players are used to perform a particular n-party secure computation, for an especially selected function f, and for especially selected inputs.

Let ($S_1$,SRP) be the input of player 1, ($S_2$, BRP) be the input of player 2 and s the input for any other player, where S1 is the secret signing key of the seller, SRP the reserve price of the seller, S2 the secret signing key of the buyer, BRP the reserve price of the buyer, and s the empty string. Further, let f be the function such that $f(($S_1$,SRP), ($S_2$,BRP), \epsilon, . . . ,\epsilon) =$ $(SIG(S_1,(T,SRP + BRP/2)), SIG(S_2,(T,SRP + BRP/2)))$ if $SRP \leq BRP,$ and "NO DEAL" otherwise. Here T is any string describing the transaction in any sufficient way. For instance, T may consist of identifying the seller and the buyer, the negotiated commodity, and/or additional data, such as time data, or an indication of the trustees.

Thus, function f outputs a certified commitment for the seller and buyer to trade, at a meet-in-the-middle price, whenever the deal is possible, i.e., whenever SRP<(or equal to) BRP. (Of course, within f, one could replace SRP +BRP/2 with any strategy, g(SRP,BRP), to determine the actual trade price.) Therefore, the function f only depends on the inputs of seller and buyer, and not on the inputs of the trustees (these could be any value rather than $\epsilon$, because f may ignore them anyway).

The above is a "blind negotiation" system because both seller and buyer end up with a signed contract with the right price whenever a deal is possible between them; otherwise they end up with a proof that no deal is possible, but which does not reveal what the two reservation prices may be. In case a deal were possible, preferably the contract is signed by both of them digitally. Indeed, in this case the output of the secure computation is the signature of the buyer and the seller that the transaction T has resulted in a sale at a given Price. Thus, the above system satisfies the Enforceable Agreement property. Indeed, whenever SRP is greater to or equal to BRP, seller and buyer end up with a binding contract at an agreed price determined by a given formula.

In case a deal were not possible, then the result of the secure computation is NO DEAL, and this is a proof that SRP>BRP (because of the way the function f is defined, because an honest majority exists among the selected players so that f is correctly computed, and because the result of the computation has been produced by the trustees and can be thus "witnessed by them" if necessary). An alternative proof that no deal is possible can be obtained by modifying the function f so that $SIG_S(T,NO\ DEAL)$ and $SIG_B(T,NO\ DEAL)$ is output instead of just NO DEAL (where the subscript S stands for seller and B for buyer). Either way, the reconstruction of NO DEAL does not reveal what the specific values of SRP and BRP may be, save for the fact that SRP>BRP. Indeed, in a secure computation of a function, only the result of the function evaluation is made known, but not the function's inputs. Thus, if a given computation of f results in outputting NO DEAL, then this output reveals that SRP is greater than BRP but not the specific values thereof. Thus, any other information about SRP, BRP and the seller's and buyer's secret signing key is kept totally secret. The above system thus also satisfies the Proved Privacy property.

A Second Share-Method

The above method, however, may be enhanced by having seller's and buyer's signatures computed outside the share computation phase. Before engaging in any secure computation, buyer and seller sign (preferably digitally) an initial agreement of the kind "in this transaction T, with trustees $T_1$, $T_2$, . . . , seller S and buyer B agree to trade commodity C at the average of their reserve prices, if their secure computation of function f is YES." Then, seller, buyer and trustees securely evaluate f on inputs (SRP,BRP,ϵ, . . . , ϵ), making sure that this computation is bound to identifier T. Here, f is the function such that f(SRP,BRP,ϵ, . . . ,ϵ)=YES if SRP≦BRP, and NO otherwise. Thus, if the result is YES, the players retrieve SRP and BRP from their shares (alternatively, f may output (SRP, BRP) rather than YES), and seller and buyer can then easily both sign (T,SRP+BRP/2). If one of them refuses to do so despite the result of the computation, then the honest trustees may sign in his or her place, and the signatures of a suitable majority of the trustees may be considered equally binding. If the share computation phase indicates that no deal is possible, then seller and buyer will each sign (T,NO), or the trustees will do it on their behalf. (Notice that it is not important who signs an initial agreement first. Indeed, only after both seller and buyer have signed it will a secure computation of f follow or be completed.)

Of course, many variants of this basic method can be implemented. For instance, different types of initial agreements may be stipulated. Also, in any of the blind negotiation systems, seller and buyer may not participate in as players in the secure computation phase. The players of this phase can just be trustees (so that it is easier to have a suitable honest majority). Thus, each of seller or buyer may just give each trustee his or her proper share of the input, and then the entire computation will be carried over the shares by the trustees, until the final result is produced and handed out to both seller and buyer. Also, the trustees (or seller and buyer) may just sign NO or nothing at all, rather than signing (T,NO). As for T, it is preferable that it provides a unique identifier of the current negotiation. For instance, T may include some of S, B, the current date and time, a description of the commodity on sale, as well as encryptions of SRP or BRP, or an indication of the trustees, or a random identifier.

A Third Share-Method

The first alternative embodiment, wherein digital signatures are carried out outside the share computation phase, may also be enhanced. Indeed, a typical secure computation protocol succeeds in securely evaluating a given function by means of securely computing some primitive functions, for instance, modular addition and modular multiplication.

Accordingly, rather than directly applying some ready-made secure computation protocols in the secure computation phase of the inventive blind negotiation protocols, it may preferable to write a new ad hoc protocol for this purpose that uses the above primitives in an elementary way. One such protocol is now described.

The new protocol uses as a primitive the share computation of $(a-b)r\ mod\ p$, where a, b, and r are secret values in the multiplicative group mod p, and p is preferably a prime (in which case a, b, and r are between 1 and p-1 ). In this application, a and b may be specific values (e.g., the private inputs of specific players), while r is a random value, possibly chosen during the computation itself, and it may not belong to any particular player. For instance, r may be chosen as the sum rood p of several random secret values $r_i$'s belonging to different players.[2]

[2] If r is chosen this way, while each $r_i$ may be between 1 and p-1, their sum mod p may be 0. However, if p is suitably large (e.g., 50- or 100-bit long) the probability that the resulting r is 0 when at least one $r_i$ is secretly and randomly chosen, is quite negligible. Thus, from a practical point of view, r can be chosen in this matter if desired.

One advantage of the (a-b)r primitive is that its share computation is readily implemented. Indeed, the share computation of a single addition/subtraction and a single multiplication modulo p of secret values (such as a, b and r) is particularly easy to obtain.

A second advantage of the (a-b)r primitive is that it can be used to test whether two given secret inputs a and b are equal without releasing any additional information. In fact, if a=b, then (a-b)r-0 no matter what the actual value of a, b and and r may be. Alternatively, if a≠b, (a-b) is a fixed non-zero number. Thus, multiplying modulo p this fixed number by a number r between 1 and p-1, yields a number modulo p different from zero. Moreover, because r is random, this product modulo p is a random number between 1 and p-1, and thus cannot betray what the precise values are of a and b.

These advantages make the (a-b)r primitive especially suitable for constructing a practical and general type of blind negotiation. In particular, assume that the seller's and buyer's reserve prices are in the interval [M,N]. That is, M and N are, respectively, agreed (or obvious) lower- and upper-bounds to both SRP and BRP in some given currency. That is, each value between M and N is interpreted as a possible price in dollars, or tens of dollars, or thousands of dollars. (Such M and N can be easily made part of the description, T, of a given negotiation.)

In a particular example, the seller is a car dealer. Buyer and seller are "blindly" negotiating over a new compact car (of a given brand, type, and color) over the Internet. Although dealers should welcome offers from customers outside their own trade area, traditionally they do not like negotiations at a distance because they reveal their reserve prices to someone who may not be serious about any offer discussed (and who may just live a few blocks away). In such a setting, if the players choose thousands of dollars as their currency, they may set M=4 and N=40. (That is, if it is assumed that the car is going to be sold the price will be between $4,000 and $40,000). Alternatively, they may choose $500 or $250 as their basic currency, in which case they may set, respectively, M=8 and N=80, or M=16 and N=160.

For each price i between M and N, the seller chooses a value $S_i$ as follows. If i<(or equal to)SRP, then the seller chooses $S_i$ at random between 1 and p-1 (each such random value is chosen independently from all other such values);

else, she sets $S_i=0$. (Thus, $S_i=0$ only if price i is acceptable to her.) Symmetrically, for each i≦BRP, the buyer sets $B_i=0$, and, for each i>BRP, he chooses $B_i$ at random between 1 and p-1. (Thus, $B_i=0$ only if price i is acceptable to him). Then, in the presence of trustees a secure computation of the new primitive is executed for each i∈[M,N]. That is, for each i∈[M,N] the value $(S_i-B_i)R_i$ is computed (without revealing any additional information about $S_i$ and $B_i$), where each $R_i$ s independently and randomly selected between 1 and p-1. If one of these computations returns a 0, then the deal is possible and agreement if forced. However, if no 0 is obtained, then no agreement is possible and seller and buyer may decide to negotiate again or quit. (Preferably, they had signed an initial agreement prior to executing this procedure indicating their intentions, currency, names, time, etc., and what happens in case of a positive outcome, i.e., in case for some price I the computation of $(S_i-B_i)R_i$ yields zero. This initial agreement can be produced in a standardized manner so as to be more convenient and quite compact.)

How this scheme works can now be explained. Assume first that SRP≦BRP. Then, secure computation of $(S_i-B_i)R_i$ is analyzed in three cases: (1) when i<SRP≦BRP, (2) when SRP≦i≦BRP, and (3) when SRP≦BRP<i. In Case 1, the secure computation of $(S_iB_i)R_i$ will return a non-zero random number. Indeed, for each such value of i, $B_i=0$, thus $(S_i-B_i)R_i$ equals just the product mod p of $S_i$ and $R_i$. Since each of these numbers is different than 0, so will be their product mod p. (Moreover, this product will be a random number between 1 and p-1 because $R_i$ is random.) In Case 2, $S_i=B_i=0$. Thus $(S_i-B_i)R_i=0$ for any possible value of $R_i$. In Case 3, $S_i=0$. Thus, the secure computation returns the product mod p of $B_i$ and $R_i$. Since each of these values is different than 0, so is their product mod p. (Moreover their product will be a random value between 1 and p-1 because so is $R_i$.).

Assume now that BRP<SRP. Again, there are three cases to analyze in the secure computation of $(S_i-B_i)R_i$: (1) i<BRP<SRP, (2) BRP≦i≦SRP, and (3) BRP≦SRP<i. In all three cases, however, what is returned is a random number between 1 and p-1, independent of what specific values SRP and BRP may have. Thus, such a result, while proving that no deal is possible (i.e., that SRP>BRP), does not reveal any other detail about the specific values of SRP and BRP.

Therefore, the new primitive shows only the prices i for which both the seller and buyer entered 0 (i.e., all and only those prices at which they are both willing to trade), and thus a sale is possible. Thus, if even a single 0 occurs as the result of the share computation relative to some price i, thanks to their initial agreement, seller and buyer end up with an enforceable agreement to trade at a given price p.

There are several ways to compute price p. For instance if min is the minimum value of i for which 0 was returned and max the maximum value of i for which a 0 was returned, the initial agreement and the result of the secure computation (as properly witnessed or signed by a suitable number of the players) may be taken to constitute a signed contract to trade the given commodity at price min+max/2.

Notice that either the seller or the buyer may enter 0 for some values of i without entering 0 from that point on (i.e., for all values higher than i in the seller case, and for all values lower than i in the buyer's case).[3] This may indicate that the seller (buyer) is willing to sell (buy) at certain prices only, and not, for whatever reason, at all prices higher (lesser) than a given one. The system may recognize this behavior as legitimate (e.g., the final price may be chosen to coincide with a value i, min≦i≦max, properly selected among those for which 0 was returned —e.g., i=min, or i=max, or, preferably as equidistant as possible from rain and max, with a way to break ties). If it is desired to disincentivize this behavior, however, whenever two or more 0's are returned but the returned 0's do not constitute a contiguous sub-segment of [M,N], all values $S_i$ and $B_i$ relative to any position between the first 0 and the last 0 are recovered (e.g., from the shares in possession of sufficiently many trustees for secure computation purposes), and if the buyer has put 0 consistently in these positions, then some proper action may be taken. For instance, the seller is obliged to sell at a punishingly cheap price (and a punishingly high for the buyer). If both the seller and buyer have not put their own 0's in a consistent way, then some proper action may be taken. For instance, the trade price will be decided in some other way, or both will be fined.

[3] For instance, the seller may just enter 0 for the single value of i, strictly less than N and strictly greater than M.

Although not meant to be limiting, many of the above computations can be effected in secure hardware of by persons using such hardware or other known machines including computers. In addition, although the various methods described are conveniently implemented in a general purpose computer selectively activated or reconfigured by software, one of ordinary skill in the art would also recognize that all methods of the present invention may be carried out in hardware, in software, or in more specialized apparatus constructed to perform the required method steps.

Share-Methods with Players

In a modification of the above embodiment, any of our share-methods for blind negotiations can be implemented so that computing actions are taken by the trustee together with players one and two. This yields a share-based blind negotiation system with a plurality of players, where a player may be the first party, a second party or a trustee. In such modifications, one of the two parties may give a share of his reservation price to the other party. Of course, the two parties have enough information to reconstruct both their own reservation prices but, like in the above share-method, any suitably-small subset that does not include both parties does not possess enough information to construct the reservation price of the (missing) party.

Single-Trustee Blind-Negotiation Systems

It may be preferred that a blind negotiation system use only a single trustee in that it be further simplified. One way of achieving this would be to have the seller tell the trustee her own secret value SRP, and have the buyer tell the trustee his own secret BRP, so that the trustee can announce whether a deal is possible, and at what price, without revealing additional information about SRP and BRP. The trustee, however, then learns both SRP and BRP. Even if he may be trusted to keep the received SRP and BRP confidential, he will nonetheless have learned these values, and this may not be acceptable.[4]

[4] For instance, assume that, after trusting the trustee to this extreme extent, it turned out that no deal was possible between seller and buyer because SRP>BRP. Then the seller should be able to negotiate with others the sale of the same commodity, keeping intact her bargaining power. However, the trustee himself would not be able to negotiate blindly with the seller!

It is therefore preferred to implement a blind-negotiation system with just one trustee possessing the following attractive properties: (1) seller and buyer perform their own computations and then they transmit to the trustee some proper piece of information, which the trustee then further processes to conclude the negotiation; and (2) the trustee does not learn any thing about SRP and BRP (except for learning whether a deal has occurred). Thus, such a system has an elementary and convenient interaction among all parties, and yet does not give the trustee the values of SRP and BRP.

To illustrate this system, it is useful to provide a brief background about the known cryptographic notion of a trap-door permutation. This is a function that is computationally easy to evaluate but overwhelmingly hard to invert unless a special secret is known about the function. Thus, any one can, given x in the range of f, compute f(x). However, only he who knows f's secret can feasibly retrieve x from f(x).

The best known (and essentially the only known) examples of trap-door permutations are based on factoring and modular exponentiation. For instance, consider the RSA function. Let n be the product of two large (e.g., 500-bits), secret, and random primes p and q, n=pq. Because selecting such primes p and q is easy, and so is multiplying them, one can easily construct such an n. However, since no fast algorithm for factoring is known, finding the prime factorization of such an n will be hard for every one else. Thus, the prime factorization of n is a secret relative to n. Let us now see how this secret can be used to invert easily the RSA function.

The RSA is a permutation over $Z^*_n$, the multiplicative group mod n obtained as follows. Let e (for exponent) be relatively prime with (p-1)(q-1), and set $f(x)=x^e$ mod n. Then, f(x) is feasibly evaluated. Indeed, if x, the modulus, and the exponent all are at most k-bit long (e.g., 1,000-bit long), then a modular exponentiation can be computed (by the repeated squaring method) with roughly 1,500 modular multiplications without any need to know n's factorization. Moreover, such a fix) is a permutation. Indeed, it can be inverted as follows: let d be the multiplicative inverse of e mod (p-1)(q-1); that is, ed mod (p-1)(q-1)=1. Then, (always operating mod n, and thus mod (p-1)(q-1) at the exponent) we have $(X^e)^d=e^{ed}=x$; that is, the function $x^d$ mod n is the inverse RSA function (with exponent e), $x^d$ mod $n=s^{-1}(x)$.

This proof not only shows that $x^e$ mod n is an invertible function (independently of how much time inverting it may take), but also that it is a trap-door function. Indeed, he who knows p and q, and thus (p-1)(q-1), can easily compute d and thus easily invert the RSA function.[5]

[5] The RSA function can be defined more generally—e.g., for any composite number n and any exponent e relatively prime with $\phi(n)$, where $\phi$ is Euler's totient function. This more general functions may too be used within our inventive blind-negotiation system. Similarly, one could use Rabin-like trap-door functions, or other function, if so wanted.

The inventive system makes use of such a trap-door function $f(x)=x^e$ mod n. While the buyer knows n and e (e.g., because the seller gives them to him, or because they are publicly known), preferably only the seller knows n's factorization, (p,q), or, equivalently, d, the multiplicative inverse of e mod (p-1)(q-1).

The system also makes use of preferably a one-way (possibly collision-free hashing) function H. Thus, while it is easy, given x, to compute y=H(x), it is practically impossible, given y, to compute an x such that H(x)=y. (In this setting it is not necessary that H be a trap-door permutation. Indeed, it is preferable that H is not trap-door, and that it is a totally different function all together, and not a RSA-like).

Let now M and N, respectively, be lower- and upper-bounds for the reserve prices of seller and buyer, and let i be the actual SRP and j the actual BRP (thus, M≦i, j≦N). The new blind-negotiation system is preferably implemented by means of three steps: a buyer's step, a seller step, and a trustee's step. Each transmission in the system preferably occurs in a private manner; for instance by encrypting it with a key shared with or owned by the recipient to ensure that no cleartext message falls in the wrong hands.

In the buyer's step, the buyer B selects, preferably at random, a secret x mod n. Then, he evaluates f, on input x, N-M times, so as to obtain the following sequence of values (presented in reverse order):

$$Z_0=f^{N-M}(x), Z_1=f^{N-M-1}(x), \ldots, Z_{N-M}=f^0(x)=x.$$

(i.e., $Z_1$ is the first f-inverse of $Z_0$, $Z_2$ is the second f-inverse of $Z_0$, and so on.) Because his BRP is j, the buyer then computes $H(Z_j)$, and sends this value to the trustee, preferably (digitally) signed together with additional information.[6] To the seller, the buyer instead gives $Z_0$, preferably signed together with additional information.

[6] Such additional information preferably describes the transaction and is taken to be a proof of the buyer's willingness of entering it. For instance, the additional information may include any of the following date: seller's information, buyer's information, transaction information, good-on-sale information, time information, $Z_0$, any other information, or no information.

In the seller's step, the seller given her knowledge of f's secret information—e.g., n's factorization) may easily compute all the first N-M inverses of $Z_0$. However, because her SRP is i, she evaluates the one-way function H on the first i such inverses, and then evaluates H on another N-M-i values $V_k$, each preferably distinct from any of the first N-M f-inverses of $Z_0$. Thus, she gives the trustee the resulting sequence of N-M values, preferably in random order:

$$H(Z_1), H(Z_2), \ldots, H(Z_i), H(V_1), \ldots, H(V_{N-M-i}).[7]$$

[7] The seller may just compute the first i inversers of $Z_0$ AND choose the $V_k$ VALUES at random, if the probability that one of these values $V_k$ EQUALS ONE OF THE FIRST N—M INVERSES OF $Z_0$ IS SMALL. Computing all such inverses is desirable, as will be seen.

In the trustee step, the trustee preferably makes sure (e.g., by using the additional information), that the seller's list and the buyer's value relate to the same negotiation. The trustee checks whether one of the N-M values received from the seller equals the value received from the buyer. If so, it announces that a deal is possible; otherwise, it announces that no deal is possible. This announcement is preferably signed by the trustee together with additional information, and sent to both seller and buyer. In case the deal is possible, the dealer preferably includes in his announcement the value of the buyer, $H(Z_j)$, together with the buyer's signature of it, and the seller's list, together with the seller's signature of it.

This scheme works for the following reasons. First, it should be noticed that the trustee does not learn j (i.e., the BRP) from the information it receives from the buyer. Indeed, although given $Z_0$ (i.e., within the additional information) the trustee does not know how to invert the RSA function f, and thus does not know any of the N-M inverses of $Z_0$. Of course, the trustee could, given $Z_j$, easily verify that this is the jth inverse of $Z_0$. Indeed, the trustee could evaluate f on input $Z_j$ by the buyer, but $H(Z_j)$ should, from a practical point of View, be equivalent to having nothing at all about $Z_j$. Thus, the trustee has a very hard time determining what j may be from the buyer's information.

Similarly, the trustee cannot easily learn the value of i from the information obtained from the seller. Indeed, the trustee receives from the seller N-M items altogether; i items obtained by evaluating H at inputs that are the first f-inverses of $Z_0$ and N-M-i items obtained by evaluating H at inputs that are not such f-inverses. However, the one-way function H makes it difficult for the trustee to decide whether an individual item is of the first of second type; thus, the trustee cannot count how many type-1 items are there. Indeed, H is chosen so that the trustee cannot practically distinguish between a value obtained by evaluating H at a f-inverse, and one obtained by evaluating H at some different input.[8]

Notice also, that one can, within the scope of the invention, use functions H that are not one-way, but more care is needed. For instance, one can choose H(x) to consist of the last—say—50 bits of x. Now 50 bits of $Z_k$ may not be enough for reconstructing $Z_k$. This is not so because taking the last 50 bits is a one-way function, but because 50 bits of crisply-clear information about x are just too few to reconstruct a secret long value x, even if $f(Z_k)$, where f is a trap-door or one-way function, is known, Also, the last 50-bits of the RSA inverses (as evidenced by the results of Alexi et al.) may be unpredictable and thus quite random looking. Thus, it would still be hard to distinguish between the last 50 bits of the RSA inverses (the type-1 values) and 50-bit random values (the type-2 values). However, one has to be careful in constructing the blind-negotiation system so that the buyer cannot misuse the system to invert the RSA. Indeed, it is also shown by Goldwasser et al. and Alexi et al. that given an oracle for guessing the last 50 bits of several RSA inverses, one may discover the full RSA inverse on an input of interest. Now, while in general no such oracle is available, the seller herself may, through the mechanism of the blind-negotiation system, provide such an oracle. Indeed, she is called by the system to provide the last 50 bits of several RSA inverses. However, if H is a proper one-way function, such cryptanalitic attacks will become essentially impossible, and the seller my release H evaluated at any RSA inverse without fear.

[8] Rather than obtaining type-2 values by evaluating H at inputs $V_k$ that are not the first f-inverses of $Z_0$, the seller could choose her type-2 values in some other manner (e.g., by choosing N-M-i values $U_k$—of the proper length—at random, because the probability that these chose values happen to be of type 1 is negligible), provided that such values are not easily distinguishable from type-1 values.

Finally, it should be appreciated that, except for the fact of whether or not i>j, the trustee may not practically learn anything more about i and j from taking into consideration both the information received from the seller and that received from the buyer.

Indeed, assume first that there is no possible deal (i.e., that i>j). Then, the only additional information that the trustee gets from the seller's list and buyer's value taken together is that the buyer's value does not occur in the seller's list. But this does not help the trustee retrieve the precise values of i and j at all.

Assume now that a deal is possible (i.e., that $i \leq j$). Then, the trustee sees that the buyer's value, $H(Z_i)$, is an item in that seller's list, and therefore learns that $H(Z_j)$ has been obtained by evaluating H at one of the first N—M f-inverses of $Z_0$. However, if the seller's list is presented in random order, the trustee still cannot figure out what the value of j may be, nor the value of i.

In sum, therefore, the single trustee, doing only local and trivial computation, learns whether a deal is possible, but never the values of the reserve prices.[9] The trustee, however, enables the seller and buyer to learn each other's reserve prices—so that they can both, for instance, compute i+j/2.

[9] In case a deal is possible, however, and the actual trade price is chosen to be i+j/2, protecting the secrecy of i and j from the trustee may be deemed to be less crucial. (Indeed, in this case each of the seller and buyer may, from knowledge of his own reserve price and knowledge of the average of their reserve prices, learn readily the other's reserve price.) If this is case, the seller may actually send her list to the trustee in order rather than randomly permuted. This still does not enable the trustee to learn anything additional if no deal is possible, but lets the trustee learn the value of j if the deal is possible. He can in fact easily see that the buyer's value is the jth item in the seller's list.

Consider first the seller's situation. Indeed, if the trustee gives the seller the buyer's value $H(z_j)$, she easily learns j, because she knows the value of every single f-inverse of $Z_0$, and thus check which inverse, after evaluating H on it, yields the buyer's value. Further, if the buyer's value is given by the trustee to the seller with the buyer's signature, then the seller receives a proof of what j is, and thus a proof that he was willing to buy at price j. Similarly, by receiving the seller-signed seller's list, the buyer receives a proof that she was willing to sell at price i. (In fact, the buyer knows at least the first j f-inverses of $Z_0$, and thus (because j>i when the deal is possible), he can check and prove that the seller's list contains the first f-inverses of $Z_0$.). These proofs, preferably together with other evidence (e.g., a proper initial agreement between seller and buyer—preferably including $Z_0$ together and with other additional information), can be used to prove in court that i+j/2 is the agreed trade price resulting from the negotiation.

The above blind-negotiation system is quite convenient from an interaction point of view (because the parties perform mostly local computations and do not talk back and forth too much). It is also computationally attractive.

Running Time Analysis

The above blind-negotiation system requires little computation because the trustee essentially just checks equality (between the buyer's value and the items of the seller's list). The buyer at most evaluates the trap-door function f and the one-way function H in the forward direction N—M times. This is particularly easy to do. First, H is preferably a non-number theoretic function and plenty of very fast non-number theoretic functions are known. Second, the exponent e of the RSA function f can be chosen quite small (e.g., equal to 3, if 3 is relatively prime with p—1 and q—1—and indeed, p and q can be chosen so that this is the case). Thus, rather than requiring a full modular exponentiation, (and thus 1.5 k modular multiplications when n, e and x are k-bit long), an RSA evaluation (e.g., a computation of $f(x)=x^e$ mod n) may require as little as two modular multiplications, and the buyer makes at most N—M such evaluations, and thus at most 2(N—M) modular multiplications overall. Moreover, the seller appears instead to perform N—M f-inversions, and thus N—M modular exponentiations, each requiring roughly 1.5 k modular multiplications. (Indeed, each such inversion consists of a computation of the type $x^d$ mod n, where d is the multiplicative inverse of e mod (p-1) (q-1); thus, even if e is chosen to be quite short, d may not be short at all.) However, the seller's computation of all required inverses may be accomplished by means of just one modular exponentiation and N—M f-evaluations (each involving two modular multiplications if e=3). Indeed, computing $Z_{N-M}$ requires that the seller inverts f, on input $Z_0$, N—M times. But this means to compute $(Z_0^d)^{N-M} = Z_0^d$ (N—M) mod n. But because in such a computation the exponents work modulo (p-1) (q-1), in effect the seller must compute $x^{d'}$ mod n, where d'=d(N—M) mod (p-1) (q-1). Thus the seller may compute d' (which is thus less than (p-1) (q-1), and thus less than n, and thus at most k-bit long) with a single modular multiplication, and then $x^{d'}$ mod n with just a single modular exponentiation. After she has computed $Z_{N-M}$, the seller computes all other N—M—1 f-inverses of $Z_0$ by simply evaluating f, on $Z_{N-M}$, N—M times, and each evaluation requires at most two modular multiplications if e is chosen equal to 3.

It should be noticed also that the value N—M may be quite small, Indeed, in the above blind-negotiations for sale of an automobile, the envisaged values of N—M were, respectively, 36, 72 and 144. Of course, if 144 is an upperbound to the possible reserve prices, so is 1,000. But, independent of other considerations, seller and buyer may have a valid incentive in ensuring that N- M is small. In particular, the trustee of a blind-negotiation (whether of this or another type with lower- and upper-bounds) may actually require payment for his services according to the monetary value of the transaction. Now this value may become clear when a deal occurs, but, because of the very nature of a blind negotiation it will not be revealed otherwise. It is thus desirable that the trustee be paid as a percentage of N or N—M, whether or not a deal occurs. It is thus in the interest of seller and buyer that N and N—M be small.

Enhancing Security

The above-described system has been described in the context of a single given blind negotiation. It should be realized, however, that an enemy may also consider attacks that occur outside a single negotiation, possibly setting up a new blind negotiation in order to discover something about an old one. It is thus recommended, in this and other blind negotiation systems as well, that each portion of a negotiation cannot be used in any other negotiation. Thus, if each individual negotiation is secure, all possible negotiations taken together will be secure as well. For instance, it is quite beneficial that the additional information be used so that it fully specifies the negotiation in question, and, if something wrong appears in such specification, then proper security measures can be taken.

For example, it is desirable that messages exchanged within a blind negotiation be customized. For instance, the seller first signs the value she sends to the trustee, and then encrypts this signed message with the trustee's key (and not the other way around—though still in the scope of the invention). This way, after the trustee decrypts, he can check that the cleartext message came from the seller (and it is to her—and to the buyer—that he will send his announcement of the outcome of the negotiation, preferably encrypted with her key). This is a practical way to customize messages; that is, to tie messages to their senders so that, in particular, no one else can take the same message and (possibly without understanding it) send it as his.

The value of customization can be seen by analyzing what may happen if it is not used. For instance (ignoring additional information and most other details), assume that a seller S gives her list L to the trustee after encrypting it with the trustee's key, and then signing the so obtained ciphertext. That is, assume that she sends $y=SIG_S(E_T(L))$, her own signature of the piece of data $x=E_T(L)$. Assume now that a malicious buyer B has blindly negotiated with S, and that the result announced by the trustee was that no deal was possible. Then, B should learn no more than the fact that the seller's reserve price was bigger than his own one. However, by means of some "outside attacks" he can exactly reconstruct the seller's reserve price as follows.

When S sends y to the trustee, B makes a copy of it (without preventing it from reaching the trustee, and without understanding what he is copying). Then, he strips out S's signature (thus obtaining an unsigned string $x=E_T(L)$ which he cannot understand) and substitutes it with the signature of an accomplice of his, C, thus obtaining the string $y'=SIG_C(E_T(L))$. Then, he pretends that he is blindly negotiating with C several times. Each time he uses the same $Z_0$, and has C send the trustee the string y'. As for his own messages, the first time he pretends that his reserve price is M (thus he sends the trustee a properly signed and encrypted $H(Z_1)$); the second time he pretends that his reserve price is M+1 (thus he sends the trustee $H(Z_2)$; and so on, until, the kth time, the trustee reports that there is a deal. Thus, B learns that the seller's reserve price was M+k.

Notice that each time the trustee notifies B and his accomplice C of the outcome of the negotiation, since, without a proper customization of the messages, he believes that B and C are the parties of these negotiations. (Of course, even if the kth time, the commodity is declared as been sold by C to B, C will ignore such sale. Indeed, C does not own the commodity at hand.) In the mean time, poor S is not even aware that this is going on.

Customizing messages neutralizes this attack. For instance, assume that even a mild form of customization is used, where the seller sends the trustee $y=SIG_S(E_T(L,AI))$, where the additional information AI specifies that the seller is S, the buyer B, and the trustee T. Then, copying y, stripping S's signature, and substituting it with that of accomplice C, and having C send T the string $SIG_C(E_T(L, AI))$ does not help much. In fact, after verifying the signature of C and removing his own encryption layer, the trustee will realize that the additional information identifies S to be the seller and not C. Thus he can take proper measures; for instance, stop the negotiation and alert S of what is going on.

Notice that if S adopts the above customization and the encryption system $E_T$ is properly designed, it would be essentially impossible for B to take the data $x=E_T(L,AI)$ and somehow transform it into another piece of data $x'=E_T(L, AI')$ that happens to be the encryption, with the trustee's key, of the same list L plus additional information AI' indicating that C, rather than S, is the seller. Similar difficulties would be encountered by the above attack if the customization is a bit different; for instance, if the sender communicates her list to the trustee by sending $E_T(SIG_S(L,AI))$, or $SIG_S(E_T(SIG_S((L,AI)))$.

A malicious buyer may steal, however, use the same customized message $M_s$ (whether $M_S=E_T(L,AI)$, or $E_T SIG_S(L,AI)$, or $SIG_S(E_T(SIG_S((L,AI)))$, or another value), and mount the above attack by keeping on sending $M_S$ to the trustee as if coming from the seller, each time pretending that there is a blind negotiation going on. At each such negotiation, he sends a different buyer's value, and possibly tries to prevent that the trustee's announcement reach the genuine seller, so as to keep her in the dark about the attack.

These types of attack can be prevented by inserting in the additional information some time information. For instance, the seller may specify what is the current date and time, in her communication to the trustee. If the trustee when receiving the information notices that the time is sufficiently old may take some proper actions (including, possibly, stop the negotiation and alerting its parties that something is wrong).

A resourceful malicious buyer, however, may do the following. When the seller in a negotiation with him sends the trustee a customized message $M_S$ (e.g., $M_S=SIG_2(E_T(SIG_S(L,AI)))$) that indicates who are seller and buyer as well as what is the time of the transmission, he may copy $M_S$, and then send it to many different trustees: $T_1$, $T_2$, etc. He then behaves as if Trustee $T_i$ is the single trustee of a blind negotiation between Seller S and the buyer B, and his price is i. Thus the first trustees will inform him that no deal is possible, but if i=SRP, then trustee $T_i$ will inform him that a deal exists. At the same time the buyer may try to prevent that these announcement reach S. But even if this does not succeed, he will end up with a legitimate purchase at price i=SRP, and thus at the minimum possible price at which the seller was ready to sell.

This attack may be prevented if the additional information AI specifies who the trustee of the current blind negotiation is, and thus only his announcement will be regarded as binding, and other trustees receiving a message of a blind negotiation that does not concern them should take proper actions in response. Another way to prevent this attack and other possible attacks consists in adding one or more rounds of communication (in fact, though the fewer these rounds are the more convenient the system is, more interactive systems are within the scope of the invention). Such additional rounds may in particular be used by having the trustee send a randomly selected value so that only responses properly including such values are considered legitimate. This makes it even harder to use portions of a blind negotiation into another blind negotiation.

Blind Negotiations with Invisible Trustees

A blind negotiation system can be implemented with trustees that are invisible. This means that an honest seller and buyer can exchange messages so that (for example, and without limitation) the buyer learns whether a deal is possible (e.g., whether SRP≦BRP) without learning the seller's reserve price, and then proves to the seller whether a deal is possible (and at what price). However, if the buyer refuses to "share" with the seller what he has learned, then the seller can go to a trustee, which up to now has been in the background, and have the trustee take action to prove to her the result of the blind negotiation (and/or any other proper action).

Thus, in such a blind negotiation system seller and buyer exchange a first set of messages in an attempt to complete their transaction, and, if the transaction is not completed, a trustee intervenes so as to complete it.

By way of background, cryptographic protocols have been described in the literature that enable two mutually suspicious players, Alice and Bob, the first having a secret input a and the second a secret input b, to evaluate a given function f on their secret inputs so as to compute the value f (a, b) without divulging more information about a and b than is already implicit in the value f (a, b) itself. A variant of such a method due to Yao was discussed in the paper of Goldreich, Micali, and Wigderson. A particular simple cases arises when the function f is the AND function, Alice has a secret bit a, Bob has a secret bit b, and the two parties want to compute the AND of a and b, i.e., a∧b, without disclosing their bits more than a ∧b already does. Recall that a ∧b=1 if and only if both bits are 1. Thus, if the secret bit of one party is 1, then, after learning the value a ∧b, that party will immediately also learn the other party's bit; indeed, that will coincide with a ∧b. For the AND function, therefore, computing it on secret inputs without revealing more about these inputs than already implicit in the result means to meet the following two conditions:

1. (Bob's privacy:) If Alice has 0 as her secret bit, then, after learning that a ∧b=0, she should not learn whether Bob's bit is 1 Or 0. Symmetrically, 2. (Alice's privacy:) If Bob has 0 as her secret bit, then, after learning that a ∧b=0, he should not learn whether Alice's bit is 1 or 0.

In the above Yao method, one of the parties (e.g., without limitation Bob) furnishes the other party (e.g., without limitation Alice) with various encrypted data having a special structure, in particular, with two ciphertexts (relative to the output bit): E0 and E1. Ciphertext E0 (encrypting a secret value V0) is openly labeled 0 and Cipertext E1 (encrypting a different secret value V1) is openly labeled 1.

Having prepared both ciphertexts, Bob knows their decryptions V0 and V1, but Alice does not, she only knows E0 and E1. If a ∧b=0, then the special structure of the data given from Bob to Alice guarantees that Alice will be able to retrieve V0 (but not V1); else, if a ∧b=1, Alice will be able to retrieve V1 (but not V0). Since the labels of these ciphertexts are known, Alice can thus determine whether a ∧b=0 or a ∧b=1.

After learning one of the two secrets relative to the output bit, and thus the value of the bit a ∧b, Alice can tell Bob what the output bit was. If Bob does not trust her, she can prove to him what the result of a ∧b is by releasing the secret she actually learned (i.e., either V0 or V1 ).

Besides enabling the computation of a ∧b, the method also guarantees Bob's and Alice's privacy conditions. Note, however, that Alice, after learning the actual value of a ∧b, can deprive Bob of this information by simply telling him nothing, not the result a ∧b, not any proof that this is Indeed the AND of their secret input bits. It is thus a goal to rectify this weakness as well as derive from any such special computation of the AND function a new blind-negotiation system, one that works with invisible trustees.

A New Blind Negotiation System

In particular, assume that M and N are, respectively, lower-and upper-bounds to the reserve prices of a given commodity, and that Alice is the seller and Bob the buyer. Then, for each possible price i between M and N, let the bit $a_i$ be 1 if SRP>i, and 0 otherwise; similarly, let the bit $b_i$ be 1 if i<BRP, and 0 otherwise.

Since SRP is Alice's secret and BRP Bob's secret, each $a_i$ is a secret bit of Alice, and each $b_i$ a secret bit of Bob. Notice that price i is acceptable to both Alice and Bob if and only if $a_i \wedge b_1=1$. Thus a deal between Alice and Bob is possible (i.e., SRP <BRP) if and only if there exist a value i such that $a_i \wedge b_i=1$. If this is the case, the actual trade price maybe chosen in various ways, for instance, as the average of l and h, where l is the lowest value of i such that $a_i \wedge b_i=1$, and h is the highest value of i such that $a_i \wedge b_i=1$.

Thus, Alice and Bob can conduct a blind negotiation by simply computing, for all i between M and N, $a_i \wedge b_i$, by means of a special AND method such as above. (Since we are using such a special AND computation for each value of I between M and N, we may use the "i" to identify the quantities E0, E1, V0 and V1 relative to the lth computation of the special AND, that is, $E0_i$, $E1_i$, $V0_i$ and $V1_i$.)

If no deal is possible, then the result will be $a_i \wedge b_i=0$ for all i. In this case, Alice cannot learn BRP beyond the fact that it must be lower than her own SRP. Indeed, for each i<SRP, $a_i=0$ and thus $a_i \wedge b_i=0$, but, because the special AND computation does not release any other knowledge, she will never learn whether $b_i=1$ or $b_i=0$ for any i<SRP; thus, she cannot learn which the value of BRP may be beyond knowing that it is less than her own SRP.

If a deal is possible, then $a_i \wedge b_i=1$ for some L in this case, the actual trade price can be computed—for instance, by computing l and h and setting the trade price to be $(l+h)/2$.[10]

[10] Note that also this method allows to avoid certain prices if so wanted. E.g., Bob may choose $b_i=1$ and $b_{i+5}=1$, but chose $b_{i+3}=0$. Again, as in one of our prior blind negotiations, this behavior of Bob may be permitted, and interpreted as his wish not to trade at price 1+3, no matter what his reasons may be. Alternatively, as indicated above, it may be agreed that setting $b_i=1$ and $b_{i+5}=1$ is tantamount to setting $b_j=1$ for all j between i and i+5, independent of the actual value of $b_j$ actually entered by Bob in a special gate.

Of course, like in all blind negotiations explained so far, Alice and Bob preferably make use of digital signatures during the process of evaluating each AND in the special way, so that each can prove who said what to whom when, and relative to which negotiation. Indeed, they may preferably sign an initial agreement, preferably specifying proper additional data for the special AND computation relative to each price i. In particular, the additional data for the ith special AND may include the ciphertext $E0_i$ and $E1_i$ (which respectively encrypt the secret values $V0_i$ and V1 i, which are not part of such additional data). Thus, the release of $V0_i$ or $V1_i$ relative to the AND computation of price i, does not just prove to Alice or Bob whether i is a mutually agreeable price, but, together with other signatures already exchanged, can be part of a provably signed contract of trade between the two parties.

We should now point out that it is (for instance) Alice who finds out the values $a_i \wedge b_i$ first, and she may or may not reveal or prove what these values are to Bob. This is indeed a feature of the above mentioned special AND computation. In our context, this may result in Alice withholding from Bob the result of the negotiation.

To avoid this, the following additional modifications are proposed. First, for each special AND computation, rather than having the encryption of V0 (denoted by E0) be openly labeled with and the encryption of V1 (denoted by E1) be openly labeled with 1, the labels of E0 and E1 may be encrypted, preferably with a key of a trustee. For instance, Bob (who prepares these two labeled ciphertexts) may label E0 with $E_T(0)$ and E1 with $E_T(1)$ (where E(x) is an encryption scheme of which a trusted party has the decryption key), and make sure that these two cipertext-label pairs are presented in random order. For instance, he may provide Alice with the label-ciphertext pairs $(E_T(1), E1)$ and $(E_T(0), E0)$. (The encryptions of the labels 0 and 1 are preferably probabilistic. For instance, $E_T(0)$ may be the encryption, with a trustee's key, of a random even number, and $E_T(1)$ the encryption (with a trustee's key) or a random odd number.[11]

[11] Of course, one may use the same encryption scheme to encrypt 0 and 1, or different scheme, such a scheme can be public key, or private key, in which case the ordinary encryption/decryption key can be known to both Bob and the trusted party.

This way, after Alice computes the decryption of E0 (i.e., V0) or the decryption of E1 (i.e., V1), she does not understand whether the result signifies a 0 or a 1. (In fact, she can see that E0 is labeled with $E_T(0)$ in that E1 is labeled with $E_T(1)$, but she does not know which of $E_T 0$ and $E_T 1$ is an encryption of 0 and which is an encryption of 1.) She thus gives V0 (respectively V1) to Bob, and Bob proves to her whether obtaining this decryption means that the AND computation resulted in a 0 or a 1 by decrypting $E_T(0)$ or $E_T(1)$ (or both), that is, Bob may give Alice the very even number used in generating $E_T 0$ (0) and/or the very odd number used in generating $E_T 1$ (0).

So far, this additional step does not appear to have accomplished much. Indeed, if before it was Alice who could withhold from Bob the result of their blind negotiation, it now appears that is Bob who could withhold the result from Alice. Indeed, Bob may refuse to provide Alice with the decryption of $E_T(O)$ or $E_T(1)$. However, Alice may go to the trusted party (preferably with data signed by Bob and data signed by herself, so as to prove that this is part of a blind negotiation). The trusted party will then provide her with the decryption of the desired $E_T(O)$ or $E_T(1)$ value.

Thus, the trustee is not needed and is totally in the background if Bob and Alice are honest (because Bob can decrypt himself what he had previously himself encrypted with the trustee's key). However, if this is not the case (like discussed above), the trustee may intervene to complete the negotiation by decrypting what is necessary for completing the transaction.

It is actually preferable that if Alice asks the trustee to decrypt (for example) an "output ciphertext label" $E_T(0)$ after presenting signed data that include her signature of V0, that is, her signature of the learned decryption of E0, the ciphertext labeled E(0). This reassures the trustee that indeed the negotiation properly started and that Alice is entitled to learning what the learned V0 means. In informing or proving to Alice that $E_T(0)$ actually means 0, it is also preferable that the trustee also informs Bob of the result of negotiation; preferably by providing him with at least Alice's signature of V0. This way Bob has a proof of what the output of the corresponding AND gate was. Thus, if the trustee provides Alice with such a proof (or result) it also provides Bob with a corresponding proof (or result).

This "joint-notification" is important because otherwise Alice could withhold the result of the negotiation (or its proof) from Bob as follows. The participates to the negotiation honestly until she computes the decryption of the output-ciphertext of each special AND gate (i.e., either $V0_i$ or $V1_i$, for each gate i). Then, she does not tell these learned decryptions to Bob, so as to learn what they mean and inform Bob of the same. Rather, she bypasses Bob altogether, goes to the trustee, and has it tell her whether the labels of the output-ciphertexts mean. This way, she learns the result of the negotiation, while keeping Bob in the dark. However, if the trustee also informs Bob whenever it informs Alice, then both Alice and Bob will learn the result. Moreover, if the trustee gives Alice the decryption of each label (e.g., the even number whose encryption was the given $E_T(0)$, or the odd number whose encryption equaled $E_T(1)$), and gives Bob the particular decryption learned by Alice signed by her, then not only will both parties learn the result of their negotiation, but they will both have a proof of what their results are.

Preferably, the labels 0 and 1 are not encrypted in a key known to just one trustee, but with a key that is split among a plurality of trustees (e.g., like in the systems suggested by Micali), so that the cooperation of sufficiently many of them is required for each $E_T(0)$ or $E_T(1)$ value to be decrypted. This way, one or sufficiently few trustees may not conspire with (e.g.) Alice in order to let just her know the result of the negotiation. The idea of replacing a single trustee with multiplicity of trustees possibly holding shares of a given secret key, also applies to other blind negotiation systems of this invention.

It is preferable that Seller and Buyer exchange messages by means of a method that gives certified return receipts. For instance, when Alice gives the learned V0 secret of a given AND gate, it is recommended that she sends such a V0 to Bob by means of a certified mail return receipt method that enables her to prove that indeed that particular value V0 was sent to Bob. Electronic, secure and practical such methods are presented in a co-pending patent application.

Actually, the use of return-receipt exchanges between Seller and Verifier also enables one to dismiss invisible trustees in the blind-negotiation systems. For instance, if in the above system with a proper initial agreement Alice learns a value $V_i$ relative to the ith AND computation of a price (i.e., $V_i$ equals either $V0_i$ or V1 i), and sends it to Bob by a certified return-receipt method (which preferably shows what the sent value actually was), if Bob does not respond with a proof of the result of the computation, she has enough information to receive justice in some form of court. Such courts, however, could be interpreted as invisible trustees too, though not even their keys have been used in the negotiation.

Making Blind Negotiations Transparent

In practice, a single-trustee blind negotiation system may be quite attractive (given that the trustee does not learn the reserve prices anyway). However, one may still fear that the trustee is not trustworthy. For instance, though a blind negotiation indicates that a deal is possible, the trustee may announce that it is not possible and let the buyer know the items appearing in the seller's list. (Note that these items will reveal the seller's reserve price if the buyer knows $Z_{N-M}$).

Thus, although the seller may not mind if the buyer learns her reserve price when a deal occurs, the trustee might enable the buyer to learn the SRP when there is no deal at all.

Some of this cheating may be prevented or dissuaded as follows. When the trustee declares that there is no deal, rather than just saying so, he also signs an encryption of the information he receives from the seller and the buyer. This signed encryption of the seller's list and the buyer's value may consist of the very encryptions that seller and buyer gave the trustee in their respective steps. Indeed, in order to give the trustee her list in a private way, the seller preferably encrypts it with the trustee's key. Similarly the trustee might enable the buyer to learn the SRP when there is no deal at all.

Similarly, the buyer preferably sends the trustee his own value after encrypting it with a trustee's key. Moreover, each of the seller and buyer signs his own data (preferably together with additional data) prior to encrypting it with the trustee's key. Thus the trustee may release these two encrypted signatures when saying that no deal is possible, preferably signing the whole thing himself also.

The reason for announcing such signed encryption when the deal is not possible is to enable either the seller or the buyer to request that the blind negotiation be made "transparent." In this case, the trustee must remove his own encryption layer, thus revealing in an authenticated way the seller's list and the buyer's value.

If, after decrypting the seller's list and the buyer's value, it appears that indeed there was no deal possible (because the buyer's value does not appear in the seller's list), then proper measures can be taken. For instance, assume that the negotiated commodity is yet unsold and that it is the buyer who called for the blind negotiation to become transparent. Then, after learning the values SRP and BRP, and realizing the SRP>BRP, the buyer may be forced to purchase the commodity at price SRP (or N, or SRP+N/2, or SRP+a given amount—either fixed or dependent on N, M etc.—) or at any other price deemed proper.

Thus, the seller may not mind that her SRP value was made known because she will be able to sell at that price or better. (Alternatively, the buyer may be properly fined—e.g., by a fixed amount, or as a percentage of SRP, N, etc.—e.g., by a fixed amount, or as a percentage of SRP, N, etc.—without forcing a sale of the commodity.)

Assume now that, after the blind negotiation was made transparent at the buyer's request, it appears that indeed no deal was possible, and that the seller has already sold her commodity to someone else. Then, other proper measures may be taken. For instance, the buyer may be obliged to pay the amount of SRP to the seller without receiving the commodity in exchange, or he may be fined according to a proper formula, etc. (Alternatively, it may be agreed that after the result of a blind negotiation is negative—i.e., the outcome is "no deal" —one has only a prescribed window of time to request to make it transparent, and that the seller should not sell the commodity during that time.)

Assume now that, after the negotiation has been made transparent, it appears that the trustee announced the wrong result. Then, other proper measures can be taken. For instance, not only the trustee can be made financially responsible for paying what it is deemed proper, but he can be also criminally prosecuted. Thus, the possibility of having the blind negotiation transparent will add a great incentive for the trustee to remain honest.

Of course, a trustee who has lied within a blind negotiation may not wish to decrypt at all. Thus, measures should be taken that dissuade him from taking this course of action.

Alternatively, it may be required that the trustee's key may be shared among many other trustees (e.g., by one of the methods of Micali) so that if the trustee refuse to decrypt, the other trustees may intervene and remove his encryption layer anyone.

Forcing Good Faith in Blind Negotiations

It is desired to ensure that the participants of a blind negotiation act in good faith. By this we mean that, no matter what the reserve price of ones participant, there is at least one choice of reserve value for the other participants so that the deal is possible.

For instance, we want to disallow that a malicious buyer may waste the seller's time and resources by negotiating (without being detected) in a way that guarantees that no deal can be reached. For instance, such a buyer may give the trustee a random number R or H(R) as the buyer's value (rather than the image, under function H, of one of the first N- M f-inverses of $Z_0$). Herefore, with overwhelming probability, this number will not appear in the seller's list. Accordingly, the trustee will report that no deal is possible.

Engaging in such negotiations with the seller, the buyer may, at least temporarily, prevent that the seller negotiates profitably with others, and in general damage her. Such behavior should thus be made impossible, or easily detected.

Of course, the seller may set i=M in a blind negotiation (i.e., have her SRP to be the minimum possible value). If in these conditions the outcome of the blind negotiation still is that no deal is possible, then clearly the buyer or the trustee are cheating. Thus, appropriate measures can be taken if the seller detects and proves that this is the case. (Some of these measured are discussed in the previous section. For instance, the buyer may be obliged to buy at maximum price, or, if he can prove that his value was properly set, the trustee may be fined or prosecuted.)

However, choosing a minimum SRP may be a too expensive way for the seller to check that the buyer is negotiating in good faith. Indeed, if the buyer happens to act in good faith, the seller will essentially "give away" her commodity. Therefore, better strategies to ensure good faith participation in a blind negotiation should be sought. One of them is described below. Of course, after presenting one such strategy, many others can be easily deviced.

In her step, the seller gives the trustee, together with her usual list consisting of N—M items (i of which consist of H evaluated at the first f-inverses of $Z_0$, and N—M—i of which consist of different values) gives an additional check list. The latter consists of another N—M items, preferably in random order: $H(Z_{i+1}), \ldots, H(Z_{N-M})$—i.e., H evaluated at the remaining N—M—i f-inverses—and $H(V_{N-M-i+1}), \ldots, H(V_{N-M})$—i.e., H evaluated at i values, preferably different both among themselves and from the first f-inverses of $Z_0$ as well as from all other V values.

Notice that the trustee, though receiving the seller's list and check list, still does not understand what the value of i may be. Indeed, if H is good, any item in each list may appeal as a random number to him. Indeed, if H is good, any item in each list may appear as a random number to him. Notice too, however, that the buyer's value $H(Z_j)$ should, if the buyer is honest, appear in one of the two lists. Thus, if this is not the case, the trustee may announce so, preferably in a signed manner. At this point steps can be taken to decide who is right and proper measures can be adopted.

The trustee, rather than just announcing that the buyer's value does not appear in either the primary list nor the check list of the seller, may actually release both the seller's lists and the buyer's value, and since these have been signed by their owners, he will release these signatures too. Thus one can verify in authenticated manner what are the items in the seller's list, he items in the seller's check list, and the buyer's value. If she is right, the seller may further reveal every value $Z_k$ and every value $V_k$, so that one can verify that her lists were both well constructed (by checking where $H(Z_k)$ and $H(V_k)$ appear), and become convinced that the buyer participated to the bind negotiation in bad faith. At this point, though the seller's reserve price may be compromised, proper measures can be adopted, such as those discussed in the previous section. For instance, the commodity may be assigned to the buyer at the maximum possible price, or at price i plus a suitable additional amount.

Blind Negotiations with Duplicate Trustees

As we have seen, blind negotiations with a single trustee who does not learn the SRP nor the BRP are most convenient. However, if the trustee is not trustworthy after all, he may declare that no deal is possible (while instead i<j) and give, for instance, the buyer the seller's information (i.e., her list).

This event should be rather improbable if the trustee is properly chosen. In any case, the possibility of making negotiations transparent may be quite effective in deterring even this small chance.

There is, however, another way to prevent this cheating: duplicate trustees. That is, we envisage running the above single-trustee system with two or more trustees, treating each trustee essentially as he were the only one. Thus, while in a general blind-negotiation system with multiple trustees, the trustees may engage in non-trivial message exchanges and computations, these duplicate trustees do not. Indeed, to make life for sellers and buyers easier, duplicate trustees may use the same encryption/decryption keys, and sellers and buyers may use these common trustee-keys when talking privately to the duplicate trustee(s). This way each message needs to be encrypted only once (with the common key of the duplicate trustees) rather than many times (with the key of each of the different duplicate trustees). If they wish to use different encryptions with each of the different duplicate trustees, however, a proper encryption scheme should be used.[12]

[12]Indeed, some encryption algorithms (like RSA with small exponents) may be secure if each message is encrypted only with one key. However, if the same message is encrypted with a first key, a second key, a third key and so on, then an enemy who gets hold of these ciphertexts can easily retrieve the message.

The main advantage of having two or more duplicate trustees is the following: if a deal is possible, then every honest trustee will say so and preferably prove that this is so, thus enabling the deal to go through at the right price. Therefore, for a deal to be illegitimately declared impossible when it is indeed possible, ALL duplicate trustees must be dishonest. And the possibility of this event is even more remote.

Blind-Negotiation Systems with Secure Hardware

In a single-trustee blind negotiation-system, the problem still exists that the trustee, when the deal really is impossible, may give to one participant information relative to the other participant. For instance, he may give the buyer the seller's list(s). Of course, the trustee does not understand the SRP from this information, but the buyer will. This problem does not go away with duplicate trustees. Indeed, the other duplicate trustees may just confirm that no deal is possible, but may not be aware that one trustee is tipping off the buyer.

One effective avenue to take care of this problem and others as well is having a trustee consist of or including a secure device, for concreteness purposes only but without loss of generality, a secure chip; that is, a chip a portion of which cannot be read or tampered with from the outside. For instance, because trying to tamper with the chip or trying to read part of its protected areas causes all information in the chip to be destroyed.

One advantage of using secure hardware this way is that once such a chip has been properly manufactured, its input-output behavior cannot be changed. Thus, there is no way to "corrupt" such a trustee an convince him to behave dishonestly.

For instance, the secure chip may be manufactured to correctly perform the following operations. The secure chip receives an input i from the seller and an input j from the buyer (preferably with proper additional information, and having each party properly sign his data and encrypt it with a key known to the chip). The chip then verifies the additional information and compares the values i and j. If the information looks fine and i>j, then the chip produces an output indicating that no deal is possible. Else, the chip outputs g(i, j), where g is a function chosen to establish the actual trade price.

In either case, the chip preferably digitally signs its output together with proper additional information. (Again, other features of the above blind negotiation systems can be incorporated here—such as, initial agreement, message customization, time stamping, or having the chip give seller or buyer a random number and demanding that that number be part of future messages in the negotiation.)

Random Checking for Proper Special Structures

As we have mentioned, in the method for computing the AND function so as to satisfy Bob's and Alice's privacy conditions, one of the parties (e.g., Bob) sends Alice various encrypted data having a special structure. If this special structure is different from what it should b, then, rather than computing a ∧b, one may compute a different function (with a one-bit output), or always discover the other party's secret bit.

In the context of the above blind negotiation, it would be in Bob's interest to change the special structure so that the function f(a,b)=a would be computed instead. This way, in a blind negotiation, Bob would never offer more than Alice's SRP, though he would not know the value of SRP before hand.

It is thus important that the parties are convinced that each piece of encrypted data possesses the right special structure that makes it a special AND. In the mentioned paper of Goldreich, Micali, and Wigderson, it is suggested that (as part of the method) Bob proves to Alice that the provided cryptographic data possesses the desired special structure by means of a zero-knowledge proof. We note, however, that other well-known simpler methods can be used within our application.

For instance, assume that N—M=k is the number of possible prices for the negotiated commodity. Then, Bob may present Alice with 2 k (rather than k) pieces of encrypted data, claiming that all of them possess the special structure for implementing and AND with our privacy constraints. Alice may then choose k of them, and ask Bob to decrypt them, so that she can see that they possess the right structure. If this check is passed, then the remaining k pieces of encrypted are believed to implement correctly our AND, and they are used as in the above blind negotiation system.

This way, Bob may cheat with probability at most one half. Indeed, even if he inserts a single incorrect piece of encrypted data, with probability ½ Alice will choose it among the k piece she asks Bob to decrypt. Further, the probability may be decreased (to ⅓, ¼, etc.) by having Bob present Alice more "trial" pieces of encrypted data (e.g., 3 k, 4 k, etc.), and then have Alice choose all of them except k for decryption. Alternatively, not to increase the amount of computation and transmission too much, we may continue to use a small amount of pieces of encrypted data (e.g., 2 k), but make it counterproductive for Bob to cheat. For instance, relying on a proper initial agreement, it can be arranged that, if Bob is caught cheating or refuses to decrypt the "trial" pieces of encrypted data chosen by Alice, then is obliged to buy the given commodity at price 4N, or is fined for an amount 4N. Therefore, by cheating he expects to lose money. Indeed, of he cheats, he has probability $\leq$½ of gaining something (e.g., discovering Alice's SRP, or buying at a price that is guaranteed to be equal to SRP) whose worth is at most $N, but also has probability ½ of loosing $4N. (Of course, the probability of ½ of be caught in the amount 4N penalty are purely exemplary in other values could be chosen in their place).

GENERAL PRIVATE-FUNCTION EVALUATIONS WITH INVISIBLE TRUSTEES

It should also be noted that, as we have already mentioned, the above AND method generalizes so as to enable Alice and Bob to compute any function f(a,b) of two secret inputs a and b so as to satisfy both Alice's and Bob's privacy constraints. Again, this more general method involves Bob sending Alice encrypted data with a special structure, and having every possible output-bit variable correspond to two encryptions, E0 and E1, one labeled 0 and the other 1. The actual value of a given output-bit variable (in a given execution of a special circuitry for f) is 0 if Alice computes the decryption of the corresponding E0 value, and 1 if she computes the decryption of the corresponding E 1 value.

Again, therefore, one of the parties may withhold from the other the result of a given private-computation of f. However, we can again apply the same system developed above. That is, rather than openly labeling E0 with 0 and E1 with 1, we can label E0 with $E_T(0)$ and E1 with $E_T(1)$, where $E_T(x)$ is an encryption function for which an invisible trustee has the decryption key. The trustee, the first party and the second party act therefore, very much like in the case of the AND function, so as to yield a method where two parties A and B, each possessing a secret input, respectively, a and b, can, with the help of an invisible trustee and without revealing these inputs, privately evaluate any given function f on their inputs so that, if one party learns y=f(a,b), then so does the other. Again, by invisible trustee we mean the following: if both parties are honest, both will learn y without involving the trustee at all, but if one of the parties dishonestly tries to keep for him/herself the learned value y, then the trustee intervenes so as to ensure that both learn y (but not the other's secret input, unless that is implicit in y).

While this invisible-trustee method for privately evaluating a two-input function f is useful in general, it is particularly useful in blind negotiations. Indeed, Alice may be a seller and Bob a buyer, a may be the SRP and b the BRP, and with a proper initial agreement and use of digital signatures, they may profitably achieve a blind negotiation with an invisible trustee by privately evaluating the following (comparison) function f: f(a,b)=1 if $a \leq b$, and 0 otherwise.

Again, they may use the decryption-penalty method for "checking" that the special structures involved are present in the pieces of encrypted data used.

It is now possible to summarize the important advantages of the disclosed blind negotiations systems and methods.

What is claimed is:

1. An electronic process executed by a first party and a second party, with assistance from at least a plurality of trustees, wherein the first party has a selling reservation price (SRP) and the second party has a buying reservation price (BRP) and the parties are committed to a transaction if a predetermined relationship between the reservation prices is established, but not otherwise, comprising the steps of:

initiating the electronic process by having the first and second parties compute data strings encoding their respective reservation prices, wherein at least one of said parties uses an electronic device for such computation;

having each of the first and second parties transmit to the trustees the data strings that encode their respective reservation prices, wherein at least one of these transmissions is carried out electronically, and wherein a subset of trustees containing less than a given number of trustees does not possess any useful information sufficient for reconstructing the reservation prices; and having the plurality of trustees participate in the electronic process by taking action to thereby determine whether the predetermined relationship exists, wherein the determination is made without reconstructing the reservation prices.

2. The electronic process as described in claim 1 further including the step of:

if the predetermined relationship exists, having the trustees continue the electronic process by providing information that commits the parties to the transaction at a price according to a given formula.

3. The electronic process as described in claim 1 further including the step of:

if the predetermined relationship does not exist, having the trustees continue the electronic process by providing information that indicates that the transaction is not possible without indicating a party's respective reservation price.

4. The electronic process as described in claim 3 wherein the information does not reveal a party's reservation price to the other party.

5. The electronic process as described in claim 2 wherein the predetermined relationship is SRP<or equal to BRP.

6. The electronic process as described in claim 5 wherein the given formula is SRP+BRP/2.

7. The electronic process as described in claim 1 wherein at least one of the trustees continues the electronic process by taking action with at least one of the parties to thereby determine whether the predetermined relationship exists.

8. The electronic process as described in claim 1 wherein at least one of the trustees makes use of secure hardware.

9. An electronic process executed by a first party and a second party, with assistance from at least one or more trustees, wherein the first party has a selling reservation price (SRP) and the second party has a buying reservation price (BRP) and the parties are committed to the transaction if a predetermined relationship between the reservation prices is established, but not otherwise, comprising the steps of:

initiating the electronic process by having the first and second parties compute shares of their respective reservation prices, wherein at least one of said parties uses an electronic device for such computation:

having each of the first and second parties transmit shares of their respective reservation prices to a set of players selected from a set comprising the first and second parties and at least one trustee, wherein a subset of players, containing less than a given number of players and not one of the parties, does not possess any useful information for reconstructing the reservation price of that party, and wherein at least one of the transmissions is carried out electronically; and having the players participate in the electronic process by taking action to thereby determine whether the predetermined relationship exists, wherein the determination is made without reconstructing the reservation prices.

10. The electronic process as described in claim 9 further including the step of:

if the predetermined relationship exists, having at least some of the players continue the electronic process by providing information that commits the parties to the transaction at a price according to a given formula.

11. The method as described in claim 9 further including the step of:

if the predetermined relationship does not exist, having at least some of the players continue the electronic process by providing information that indicates that the transaction is not possible, wherein the information does not reveal a party's reservation price to the other party.

12. The electronic process as described in claim 9 wherein at least one player uses secure hardware.

13. An electronic process executed by a first party and a second party, with assistance from at least one trustee, wherein the first party has a selling reservation price (SRP) and the second party has a buying reservation price (BRP) and the parties are committed to a transaction if a predetermined relationship between the reservation prices is established, but not otherwise, comprising the steps of:

having each of the first and second parties transmit to the at least one trustee data that does not possess any useful information for enabling the trustee to reconstruct the reservation prices, wherein at least one of the transmissions is carried out electronically;

having at least one trustee participate in the electronic process by taking action to determine whether the predetermined relationship exists; and if the predetermined relationship exists, having at least one trustee continue the electronic process by providing information that commits the parties to the transaction at a price according to a given formula;

if the predetermined relationship does not exist, having at least one trustee continue the electronic process by providing information that indicates that the transaction is not possible without revealing the reservation prices.

14. The electronic process as described in claim 13 wherein, if the predetermined relationship does not exist, the information provided by the trustee does not reveal a party's reservation price to the other party.

15. The electronic process as described in claim 13 wherein the predetermined relationship is SRP<or equal to BRP.

16. The electronic process as described in claim 15 wherein the given formula is SRP+BRP/2.

17. The electronic process as described in claim 13 wherein the trustee comprises a secure piece of hardware.

18. The electronic process as described in claim 13 wherein the trustee comprises a plurality of agents.

19. The electronic process as described in claim 18 wherein the plurality of agents hold shares of a common secret key.

20. An electronic process executed by a first party and a second party, with assistance from at least one trusted party comprising secure hardware, wherein the first party has a selling reservation price (SRP) and second party has a buying reservation price (BRP) and the parties are committed to a transaction if a predetermined relationship between the reservation prices is established to exist, but not otherwise, comprising the steps of:

generating an encrypted version of each party's reservation price, wherein at least one of the encrypted versions is generated using an electronic device;

having the first party transmit to the trusted party the encrypted version of SRP and having the second party transmit to the trusted party the encrypted version of BRP, wherein at least one of the transmissions is carried out electronically;

having at least one trusted party participate in the electronic process by taking action to determine whether the predetermined relationship exists between the reservation prices without revealing SRP and BRP outside the secure hardware; and having at least one trusted party continue the electronic process by transmitting result-information to each of the first and second parties, wherein the reservation prices are not revealed if the predetermined relationship does not exist.

21. The electronic process as described in claim 20 wherein the predetermined relationship is SRP<or equal to BRP, and wherein if the trusted party determines that SRP<or equal to BRP, the result-information commits the parties to the transaction at a price determined at a given formula.

22. The electronic process as described in claim 20 wherein the predetermined relationship is SRP<or equal to BRP, and wherein if the trusted party determines that SRP>BRP, the result-information indicates that the transaction is not possible at that time without revealing the reservation price of one party to the other party.

23. The electronic process as described in claim 20 wherein in addition to the encrypted version of the SRP, the first party also transmits to the trusted party additional information, wherein the additional information includes information selected from the following: a description of the transaction, a proof of the first party's willingness to enter into the transaction, an agreed transaction price if the predetermined relationship exists, date and time, and other transaction information.

24. The electronic process as described in claim 23 wherein the encrypted version of the SRP and the additional information are digitally signed prior to transmission by the first party to the trusted party.

25. The electronic process as described in claim 20 wherein in addition to the encrypted version of the BRP, the second party also transmits to the trusted party additional information, wherein the additional information includes information selected from the following: a description of the transaction, a proof of the second party's willingness to enter into the transaction, an agreed transaction price if the predetermined relationship exists, date and time, and other transaction information.

26. The electronic communications method as described in claim 25 wherein the encrypted version of the BRP and the additional information are digitally signed prior to transmission by the second party to the trusted party.

27. The electronic communications method as described in claim 20 wherein at least one of the first and second parties use secure hardware to encrypt their respective reservation price.

28. An electronic process executed by a first party and a second party, with assistance from an invisible trusted party if needed, wherein the first party has a selling reservation price (SRP) and the second party has a buying reservation price (BRP), comprising the steps of:

(1) having the first and second party agree to execute an ideal negotiation that results in (a) a commitment to a transaction if a predetermined relationship exists between the reservation prices or (b) no commitment and the determination that the predetermined relationship does not exist without revealing the reservations prices;

(2) having the first party and the second party exchange messages to attempt completion of the ideal negotiation, wherein at least one of the messages is exchanged electronically and wherein either party can determine whether the predetermined relationship exists; and (3) if the ideal negotiation is not completed in step (2), having the invisible trustee take action to complete the ideal negotiation.

29. An electronic process executed by a first party and a second party, with assistance from an invisible trusted party if needed, wherein the, first party has a selling reservation price (SRP) and the second party has a buying reservation price (BRP), wherein the first and second parties have agreed to a blind negotiation that results in (a) a commitment to a transaction if a predetermined relationship exists between the reservation prices or (b) no commitment and the determination that the predetermined relationship does not exist without revealing the reservations prices, comprising the steps of:

(1) having the first party and the second party exchange messages to attempt completion of the blind negotiation wherein at least one of the messages is exchanged electronically; and (2) if one party does not complete certain actions required in step (1), having the invisible trustee take action to complete the blind negotiation;

wherein the trusted party comprises secure hardware.

30. The electronic process as described in claims 1, 9 or 13 wherein the transaction is selected from at least one of the following types of transactions: a sale, a lease, a license and a financing transaction.

31. The electronic process as described in claim 30 wherein the transaction involves a commodity having a value within a predetermined upper and lower range, and wherein the trustee is provided a fee according to the value.

32. An electronic process executed by a first party and a second party, with assistance from an invisible trusted party if needed, wherein the first party has a private value "a" and the second party has a private value "b" and the first and second parties have agreed to compute a given function "f" on their inputs "a" and "b", comprising the steps of:

(1) having the first party and the second party exchange messages to enable each of the parties to obtain f(a,b) without revealing "a" and "b", wherein at least one of the messages is exchanged electronically and wherein either party can determine whether the obtained value f(a,b) is correct; and (2) if one party has not obtained f(a,b) in step (1), having the invisible trustee take action so that both parties f(a,b).

33. An electronic process executed by a first party and a second party, with assistance from at least one trustee, wherein the first party has a private first value and the second party has a private second value and the parties are committed to a transaction if a predetermined relationship between the first and second values is established, but not otherwise, and wherein each party's respective value is unknown to the other party, comprising the steps of:

initiating the electronic process by having the first and second parties compute data strings encoding their respective values, wherein at least one of said parties uses an electronic device for such computation;

having each of the first and second parties transmit to at least one trustee the data strings that encode their respective values, wherein at least one of these transmissions is carried out electronically, and wherein at least one trustee does not possess any useful information sufficient for reconstructing the first and second values; and having at least one trustee participate in the electronic process by taking action to help determine whether the predetermined relationship exists, wherein the determination is made without reconstructing the private values.

34. The electronic process as described in claim 33 further including the step of:

if the predetermined relationship exists, having at least one trustee continue the electronic process by contributing information that helps commit the parties to the transaction according to a given formula.

35. The electronic process as described in claim 33 further including the step of:

if the predetermined relationship does not exist, having at least one trustee continue the electronic process by providing information that contributes to indicating that the transaction is not possible without thereby indicating the first and second private values.

36. An electronic process executed by a first party and a second party, with assistance from at least one or more trustees, wherein the first party has a secret first value and the second party has a secret second value and the parties are committed to the transaction if a predetermined relationship between the first and second values is established, but not otherwise, wherein each party's respective private value is unknown to the other party, comprising the steps of:

initiating the electronic process by having the first and second parties compute shares of their respective values, wherein at least one of said parties uses an electronic device for such computation;

having each of the first and second parties transmit shares of their respective values to a set of players selected from a set comprising the first and second parties and at least one trustee, wherein a subset of players, containing less than a given number of players and not one of the parties, does not possess any useful information for reconstructing the value of that party, and wherein at least one of the transmissions is carried out electronically; and having the players participate in the electronic process by taking action to thereby determine whether the predetermined relationship exists, wherein the determination is made without reconstructing the first and second values.

37. The electronic process as described in claim 36 further including the step of:

if the predetermined relationship exists, having at least some of the players continue the electronic process by providing information that commits the parties to the transaction according to a given formula.

38. The method as described in claim 36 further including the step of:

if the predetermined relationship does not exist, having at least some of the players continue the electronic process by providing information that indicates that the transaction is not possible, wherein the information does not reveal a party's private value to the other party.

39. An electronic process executed by a first party and a second party, with assistance from at least one trustee, wherein the first party has a private first value and the second party has a private second value and the parties are committed to a transaction if a predetermined relationship between the first and second values is established, but not otherwise, wherein each party's respective value is unknown to the other party, comprising the steps of:

having each of the first and second parties transmit to at least one trustee data that does not possess any useful information for enabling the trustee to reconstruct the first and second values;

having at least one trustee participate in the electronic process by taking action to determine whether the predetermined relationship exists; and if the predetermined relationship exists, having at least one trustee continue the electronic process by providing information that commits the parties to the transaction according to a given formula;

if the predetermined relationship does not exist, having at least one trustee continue the electronic process by providing information that indicates that the transaction is not possible without revealing the first and second private values.

40. An electronic process executed by a first party and a second party, with assistance from at least one trusted party comprising secure hardware, wherein the first party has a private first value and second party has a private second value and the parties are committed to a transaction if a predetermined relationship between the first and second values is established to exist, but not otherwise, wherein each party's respective value is unknown to the other party, comprising the steps of:

generating an encrypted version of each party's private value, wherein at least one of the encrypted versions is generated using an electronic device;

having the first party transmit to the trusted party the encrypted version of the private first value and having the second party transmit to the trusted party the encrypted version of the private second value, wherein at least one of the transmissions is carried out electronically;

having the trusted party participate in the electronic process by taking action to determine whether the predetermined relationship exists without revealing the first and second private values outside the secure hardware; and having the trusted party continue the electronic process by transmitting result-information to each of the first and second parties, wherein the private first and second values are not revealed if the predetermined relationship does not exist.

41. An electronic process executed by a first party and a second party, with assistance from an invisible trusted party if needed, wherein the first party has a private first value and the second party has a private second value, comprising the steps of:

(1) having the first and second party agree to execute an electronic negotiation that results in (a) a commitment to a transaction if a predetermined relationship exists between the private first and second values or (b) no commitment and the determination that the predetermined relationship does not exist without revealing the first and second values, and wherein each party's respective private value is unknown to the other party;

(2) having the first party and the second party exchange messages to attempt completion of the electronic negotiation, wherein at least one of the messages is exchanged electronically and wherein either party can determine whether the electronic negotiation is complete; and (3) if the electronic negotiation cannot be completed in step (2), having the invisible trustee take action to complete the electronic negotiation.

42. The electronic process as described in claim 41 wherein the first and second parties further agree that a given penalty is imposed on a party that has been found to have deviated from prescribed steps of the electronic negotiation.

43. An electronic process executed by a first party and a second party, using secure hardware, wherein the first party has a private first value and the second party has a private second value and the parties are committed to a transaction if a predetermined relationship between the first and second values is established to exist, but not otherwise, wherein each party's respective value is unknown to the other party, comprising the steps of:

providing the secure hardware the private first and second values, wherein at least one of the values is provided electronically;

having the secure hardware determine whether the predetermined relationship exists without revealing the first and second private values outside the secure hardware; and having the secure hardware provide result-information to at least one of the first and second parties, wherein at least one of the private first and second values is not revealed outside the secure hardware if the predetermined relationship does not exist.

44. The electronic process as described in claim 43 wherein if the predetermined relationship exists, the result-information provided by the secure hardware indicates a transaction price by evaluating a predetermined function of the first and second private values.

45. The electronic process as described in claim 43 wherein the result-information is digitally signed.

46. The electronic process as described in claim 43 wherein the result-information is digitally signed with other information.

47. The electronic process as described in claim 43 wherein an initial agreement occurs between the first and second parties prior to the secure hardware providing the result-information.

48. The electronic process as described in claim 43 wherein at least one of the first and second private values is provided to the secure hardware unencrypted.

* * * * *